(12) United States Patent
Butvin et al.

(10) Patent No.: US 12,136,081 B2
(45) Date of Patent: Nov. 5, 2024

(54) REPLACING A CUSTOMER CARD PAYMENT WITH A ONE-TIME LOAN AT A POINT OF SALE

(71) Applicant: BREAD FINANCIAL PAYMENTS, INC., Columbus, OH (US)

(72) Inventors: Joseph Butvin, Columbus, OH (US); Kurt Brown, Columbus, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 0 days.

(21) Appl. No.: 17/804,854

(22) Filed: Jun. 1, 2022

(65) Prior Publication Data

US 2022/0366398 A1 Nov. 17, 2022

Related U.S. Application Data

(63) Continuation of application No. 16/708,072, filed on Dec. 9, 2019, now Pat. No. 11,379,821.

(60) Provisional application No. 62/894,609, filed on Aug. 30, 2019.

(51) Int. Cl.
G06Q 40/03 (2023.01)
G06Q 20/34 (2012.01)

(52) U.S. Cl.
CPC ............ *G06Q 20/34* (2013.01); *G06Q 40/03* (2023.01)

(58) Field of Classification Search
CPC ............................. G06Q 20/34; G06Q 40/03
USPC ........................................................ 705/3–44
See application file for complete search history.

(56) References Cited

U.S. PATENT DOCUMENTS

| | | | | |
|---|---|---|---|---|
| 7,499,889 | B2 * | 3/2009 | Golan | G06Q 20/102 |
| | | | | 705/40 |
| 7,797,231 | B1 * | 9/2010 | Loeb | G06Q 40/03 |
| | | | | 705/38 |
| 9,786,005 | B1 * | 10/2017 | Poursartip | G06Q 10/06315 |
| 10,963,875 | B2 * | 3/2021 | Alvarez | G06Q 20/385 |
| 11,238,499 | B2 * | 2/2022 | Proctor, Jr. | H04W 4/80 |
| 2008/0103959 | A1 * | 5/2008 | Carroll | G06Q 40/02 |
| | | | | 705/38 |
| 2008/0208747 | A1 * | 8/2008 | Papismedov | G06Q 20/40 |
| | | | | 705/44 |

(Continued)

OTHER PUBLICATIONS

Aattar et al., "Contributions to Theoretical Economics", Multiple Lending and Constrained Efficiency in the Credit Market, vol. 6, Issue 1, Article 7, (Year: 2006).*

(Continued)

*Primary Examiner* — Frantzy Poinvil

(57) ABSTRACT

A system and method for replacing a customer's debit card payment with a one-time loan at a point of sale (POS) is disclosed. The method receives, at a POS, a debit card input from a customer to be used as a transaction payment. The POS obtains, from the debit card input, identification information for the customer. A total monetary amount of the transaction payment and the identification information is provided to a one-time loan provider's computer system. The one-time loan provider's system uses the customer identification information to perform a credit screening for the total monetary amount of the transaction payment. The one-time loan provider's system provides to the POS a one-time loan offer for the customer. The one-time loan offer to be used in place of the debit card input to make the transaction payment.

3 Claims, 19 Drawing Sheets

(56) References Cited

U.S. PATENT DOCUMENTS

| | | |
|---|---|---|
| 2010/0223160 A1 | 9/2010 | Brown |
| 2010/0228651 A1 | 9/2010 | Becerra et al. |
| 2010/0299212 A1 | 11/2010 | Graylin et al. |
| 2011/0191244 A1* | 8/2011 | Dai .................... G06Q 20/204 713/150 |
| 2011/0238567 A1 | 9/2011 | Ferreira |
| 2014/0279005 A1* | 9/2014 | Calman .............. G06Q 30/0215 705/14.58 |
| 2016/0171469 A1* | 6/2016 | Pugh ................... G06Q 20/385 705/16 |
| 2017/0255994 A1 | 9/2017 | Rieger |
| 2019/0303902 A1* | 10/2019 | Sanchez-Llorens ........................ G07G 1/0036 |
| 2020/0027087 A1 | 1/2020 | Venkatasubramanian et al. |
| 2020/0151825 A1 | 5/2020 | Cohen et al. |
| 2021/0065160 A1 | 3/2021 | Butvin et al. |
| 2021/0182304 A1* | 6/2021 | McMenemy ......... G06F 16/252 |
| 2023/0298036 A1* | 9/2023 | Franceschi ......... G06Q 20/4016 705/44 |

OTHER PUBLICATIONS

"Selecting the right home mortgage", Publication Info: Gulf News, ProQuest Document Id: 2018018633, [Dubai] Oct. 18 (Year: 2017).*
"Trefis: Growing Card Sales, Loss of Network Merchants Impact Discover's Earnings", Weblog Post, Newstex Finance & Accounting Blogs, Newstex, Jan. 23, 2015.

* cited by examiner

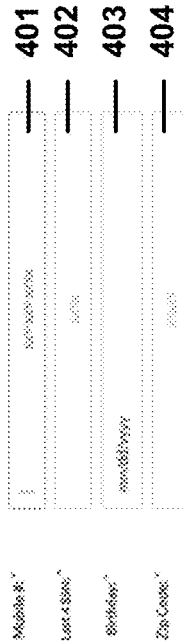
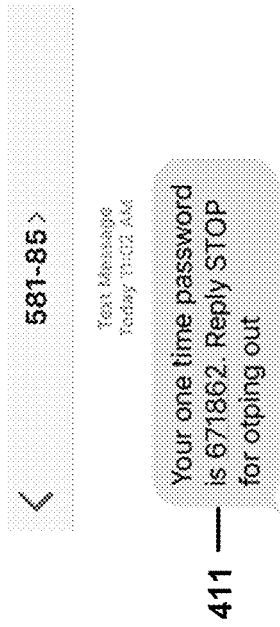
FIG. 4A
FIG. 4B

Congratulations!
You've been approved for the Beauty Central PL Credit Card. Scan now for immediate access to credit.

This temporary shopping pass will expire in 0 days of being opened. If you need more time, you may continue the session for up to a maximum of 0 days.

YOU'VE EARNED 20% OFF.
Enter Ring Code 9577

Congratulations!
You've been approved for the Beauty Central PL Credit Card. Scan now for immediate access to credit.

454

Name on Card: Carol A Jones
Credit Limit: $9,597
Account Number: 2625209826

Please use this information when you check out.
You will receive your card by mail in 7-10 days.

451
452

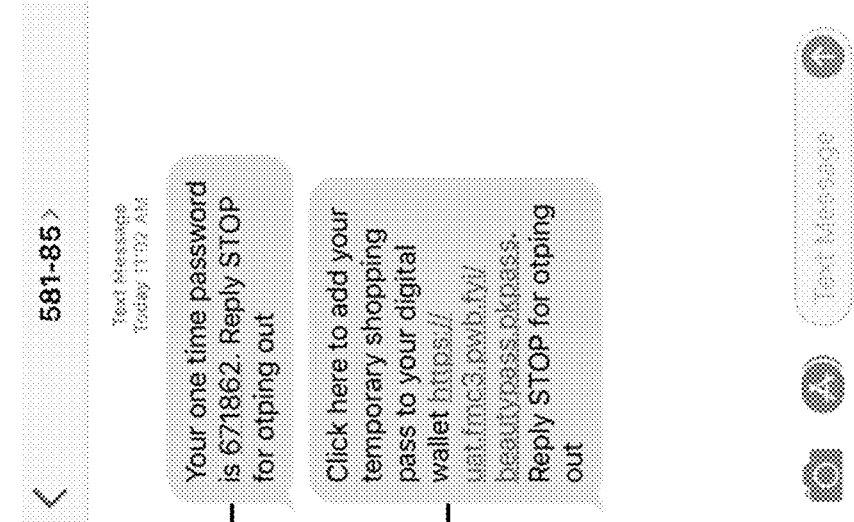
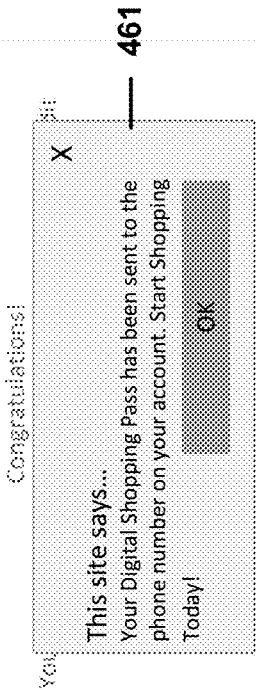
FIG. 4G
FIG. 4H

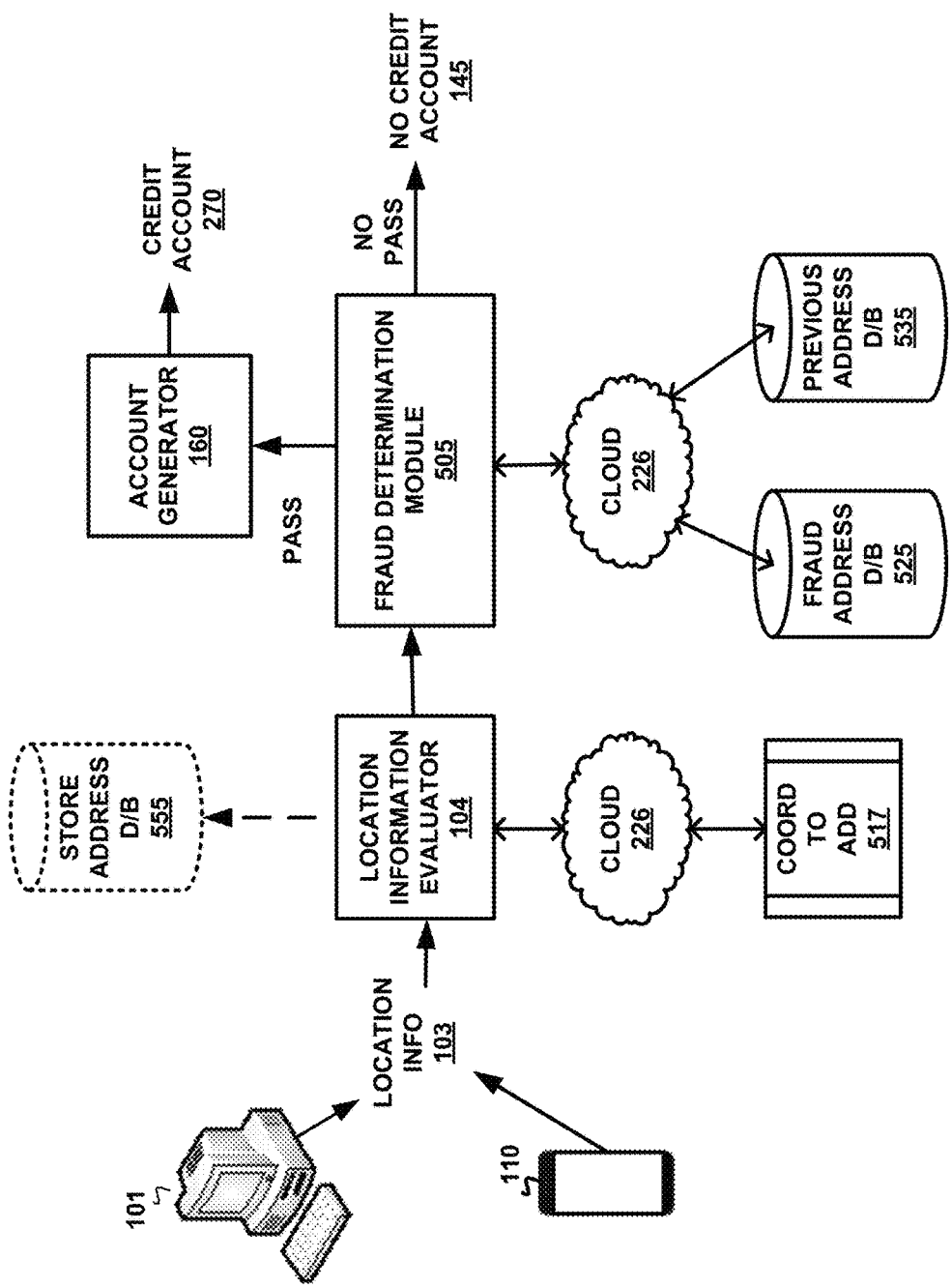

700

```
COMPARES, AT THE COMPUTER SYSTEM, THE LOCATION
INFORMATION FROM THE POSITIONING SYSTEM WITH OTHER
LOCATION INFORMATION PROVIDED ON THE CREDIT APPLICATION
710
```

```
MAKES, AT THE COMPUTER SYSTEM, A RISK ASSESSMENT BASED ON
A RESULT OF THE COMPARING
720
```

FIG. 7

REPLACING A CUSTOMER CARD PAYMENT WITH A ONE-TIME LOAN AT A POINT OF SALE

CROSS-REFERENCE TO RELATED APPLICATIONS

This application claims priority to and benefit of copending U.S. patent application Ser. No. 16/708,072, filed on Dec. 9, 2019, entitled "REPLACING A CUSTOMER CARD PAYMENT WITH A ONE-TIME LOAN AT A POINT OF SALE" by Butvin et al, and assigned to the assignee of the present application, hereby incorporated by reference in its entirety.

U.S. patent application Ser. No. 16/708,072 claims priority to and benefit of then U.S. Provisional Patent Application No. 62/894,609 filed on Aug. 30, 2019, entitled "REPLACING A CUSTOMER CARD PAYMENT WITH A ONE-TIME LOAN AT A POINT OF SALE" by Butvin et al., and assigned to the assignee of the present application, the disclosure of which is hereby incorporated herein by reference in its entirety.

BACKGROUND

Company specific, brand specific or even store specific credit offering opportunities provide significant value to both a customer and a provider. By providing a credit offering opportunity, the provider is able to tailor rewards offers, provide loyalty discounts and maintain customer brand loyalty. Similarly, the customer receives the perks from the reward offers and the loyalty discounts. In addition, a customer receiving the credit offering opportunity is likely to tell others via word of mouth, social networks, internet rating sites, and the like.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 4A is a screen capture of a web-based credit application as viewed on a user's computing device, in accordance with an embodiment.

FIG. 4B is a screen capture of a verification text to a user's mobile phone, in accordance with an embodiment.

FIG. 4E is a screen capture of a web-based credit application providing the terms and conditions as viewed on a user's computing device, in accordance with an embodiment.

FIG. 4F is a screen capture of a new credit account as viewed on a user's computing device, in accordance with an embodiment.

FIG. 4G is a screen capture of a confirmation that the new credit account information has been sent to the user's mobile phone as viewed on a user's computing device, in accordance with an embodiment.

FIG. 4H is a screen capture of a text including instructions on putting the new account into the user's mobile wallet as seen on a user's mobile phone, in accordance with an embodiment.

FIG. 5 is a block diagram of an example fraud detection system, in accordance with an embodiment.

FIG. 7 is a flowchart of a method for using position location information to verify information on a credit application, in accordance with an embodiment.

DESCRIPTION OF EMBODIMENTS

Figure 1A:
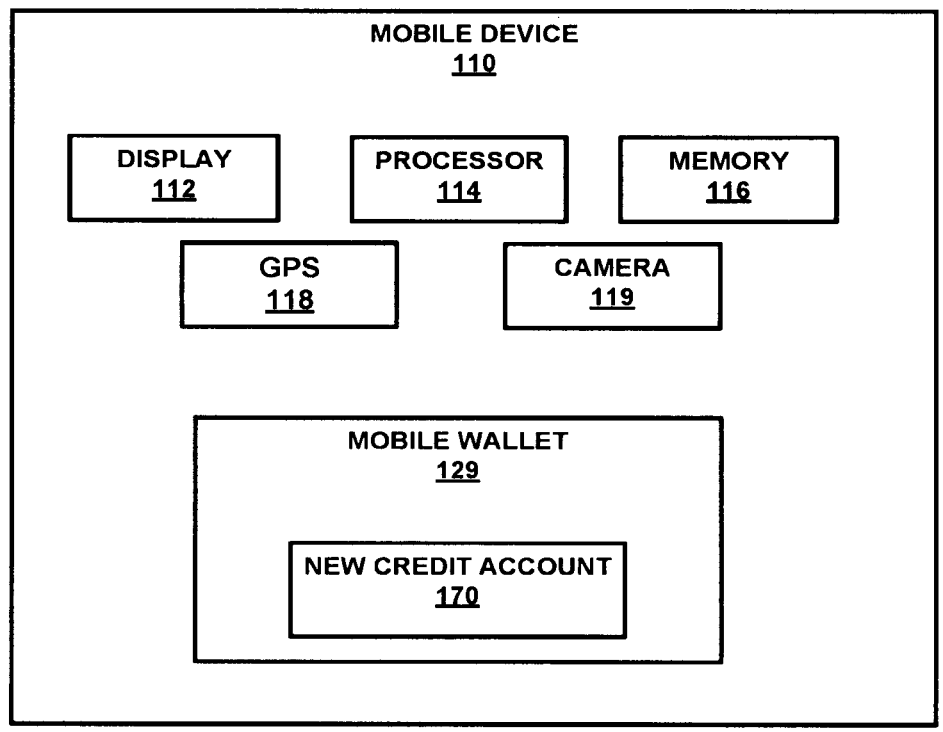
FIG. 1A is a block diagram of a mobile phone, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "deciding", "determining", "interacting", "searching", "pinging" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

It should be appreciated that the obtaining, accessing, or utilizing of information conforms to applicable privacy laws (e.g., federal privacy laws, state privacy laws, etc.).

Overview

In general, application abandonment occurs when an applicant needs to fill out an application and the applicant quits filling out the application before providing all of the needed information. In other words, the more questions on an application that require an applicant's response, the more likely that the applicant will abandon the application before completion. Thus, if the application is prepopulated with information, there will be fewer blanks for the applicant to fill in. Fewer blanks will allow the applicant to complete the application before becoming frustrated, distracted, overwhelmed, or the like. As such, the percentage of applicants that complete the application form is inversely related to the number of keystrokes required by the applicant to complete the application.

The discussion provides a novel approach for seamlessly applying for and obtaining a new credit account. Moreover, after obtaining information about the customer, that information can be used to pre-populate an application form that is accessible via a consumer's mobile phone. In other words, many fields in an application will be pre-populated which will reduce the amount of information that a consumer must manually input.

In one embodiment, as will be described herein, a mobile credit acquisition with form population that differs significantly from the conventional customer credit account application processes is disclosed. In conventional approaches, when filling out the forms to apply for credit, the customer must key in a significant amount of information such as name, address, phone number, birthday, identification number, etc. Such conventional approaches are error prone, tedious, time-consuming, and often times a user will abandon the application process before it is completed. Instead, the present embodiments, as will be described and explained below in detail, provide a previously unknown procedure for reducing the amount of data a customer has to key by locating the customer's name, address and other personal information via automated searches. Thus, embodiments of the present invention provide a streamlined method for mobile credit acquisition which extends well beyond what was previously done by hand.

Importantly, the embodiments of the present invention, as will be described below, provide an approach for seamlessly applying for and obtaining a credit account, which differs significantly from the conventional processes. As will be described in detail, the various embodiments of the present invention do not merely implement conventional mobile credit acquisition processes on a computer. Instead, the various embodiments of the present invention, in part, provide a previously unknown procedure for reducing the amount of data a customer has to key by locating the customer's name, address and other personal information via automated searches. Hence, embodiments of the present invention provide a novel process for mobile credit acquisition with form population which is necessarily rooted in computer technology to overcome a problem specifically arising in the realm of digital customer key fatigue.

Moreover, the embodiments do not recite a mathematical algorithm; nor do they recite a fundamental economic or longstanding commercial practice. Instead, they address a business challenge that has been born in the Internet-centric environment in order to overcome numerous problems specifically arising in the realm of off-site credit application and acceptance. In so doing, significant steps are removed from the customer's responsibility and the customer's time is saved.

Thus, the disclosed embodiments provide an increased fraud protection due to obtaining the customer information used in the application from a reliable source and auto-filled into the application for the credit account.

In the following discussion, a mobile phone (or mobile device) refers to a computing device that has ingrained telephony capability via a mobile carrier.

In contrast, a non-phone computing device refers to any computing device such as a laptop, desktop, notebook, or the like that does not have ingrained telephony capability via the mobile carrier. Thus, a computing device that utilizes only the Internet, Wi-Fi, or the like to make phone calls would be an example of a non-phone computing device.

In the following discussion, the term credit application is utilized. In general, a credit application obtains identification information about an applicant and uses the identification information to make a credit determination. For example, if a customer wants to obtain a credit account, the customer would have to provide, among other things, identifying information such as, name, current address, current employer, etc. The identifying information is used to perform a credit check of the customer's credit history and qualifications based on the credit issuer's selection criteria. In one embodiment, the check may occur at one or more of a number of possible credit reporting agencies.

It should be appreciated that the obtaining or accessing of user information conforms to applicable privacy laws (e.g., federal privacy laws, state privacy laws, etc.) and applicable fair credit reporting act laws. In one embodiment, prior to accessing user information, the user affirmatively "opts-in" to the services described herein. For example, during the credit application process, the user is prompted with a choice to affirmatively "opt-in" to various services. As a result, any information is obtained with the user's prior permission. Moreover, depending on present or future credit account requirements, rules and regulations, the credit application aspects described herein may be more or less formal.

In one embodiment, if the application is mobile web based instead of a mobile app, the mobile web may not be able to access the GPS data on the mobile app. However, the mobile web may be able to use the location information provided by the communication provider (carrier) to obtain location data that is similar to the mobile phone GPS data. One way to obtain the information would be to use an API to push the carrier information to the mobile web application.

In one embodiment, the application is a non-integrated application, e.g., custom code is hosted and managed by credit account provider. In one embodiment, the application is an integrated application, e.g., it provides a brand the bones of the front end such that the brand can host and modify the front end based on their own individualized criteria, while the back end remains hosted and managed by the credit account provider. In one embodiment, the application is a hybrid, e.g., the credit account provider will host and manage but they will receive front end input/design/criterion from the brand that will be used by the credit account provider to customize the front end for the brand while both the front end and the back end remain hosted and managed by the credit account provider.

Operation

Referring now to FIG. 1A, a block diagram of a mobile phone 110 is shown. Although a number of components are shown as part of mobile phone 110, it should be appreciated that other, different, more, or fewer components may be found on mobile phone 110.

In general, mobile phone 110 is an example of a customer's mobile phone. Mobile phone 110 could be a mobile phone, a smart phone, a tablet, a smart watch, a piece of smart jewelry, smart glasses, or other user portable devices having wireless telephony connectivity via a mobile service provider. In one embodiment, mobile phone 110 is also capable of broadcasting and receiving via at least one network, such as, but not limited to, WiFi, Bluetooth, near field communication (NFC), and the like. In one embodiment, mobile phone 110 includes a display 112, a processor 114, a memory 216, a GPS 218, a camera 119, and the like.

Mobile phone 110 also includes a mobile wallet 129 which is an electronic application that operates on mobile phone 110. Mobile wallet 129 includes new credit account 170. In general, new credit account 170 allows a customer to utilize a single mobile payment method that is linked to one or more credit account information, reward account information, offers, coupons, and the like, and is carried in a secure digital form on a mobile phone 110. Instead of using a physical plastic card to make purchases, a mobile wallet allows a customer to pay via mobile phone 110 in stores, in apps, or on the web.

GPS 218 can generate and provide location information with respect to the customer's mobile phone. The output from GPS 218 could be utilized by an operating system of mobile phone 110, an application (app) loaded on mobile phone 110, a web based app accessed over a network by mobile phone 110, or the like. In one embodiment, the output from GPS 218 could be provided to another computing system for identification purposes, fraud determination/evaluation, etc. In one embodiment, instead of providing GPS information, the location of mobile phone 110 may be determined within a given radius, such as the broadcast range of an identified beacon, a WiFi hotspot, overlapped area covered by a plurality of mobile telephone signal providers, or the like.

Figure 1B:
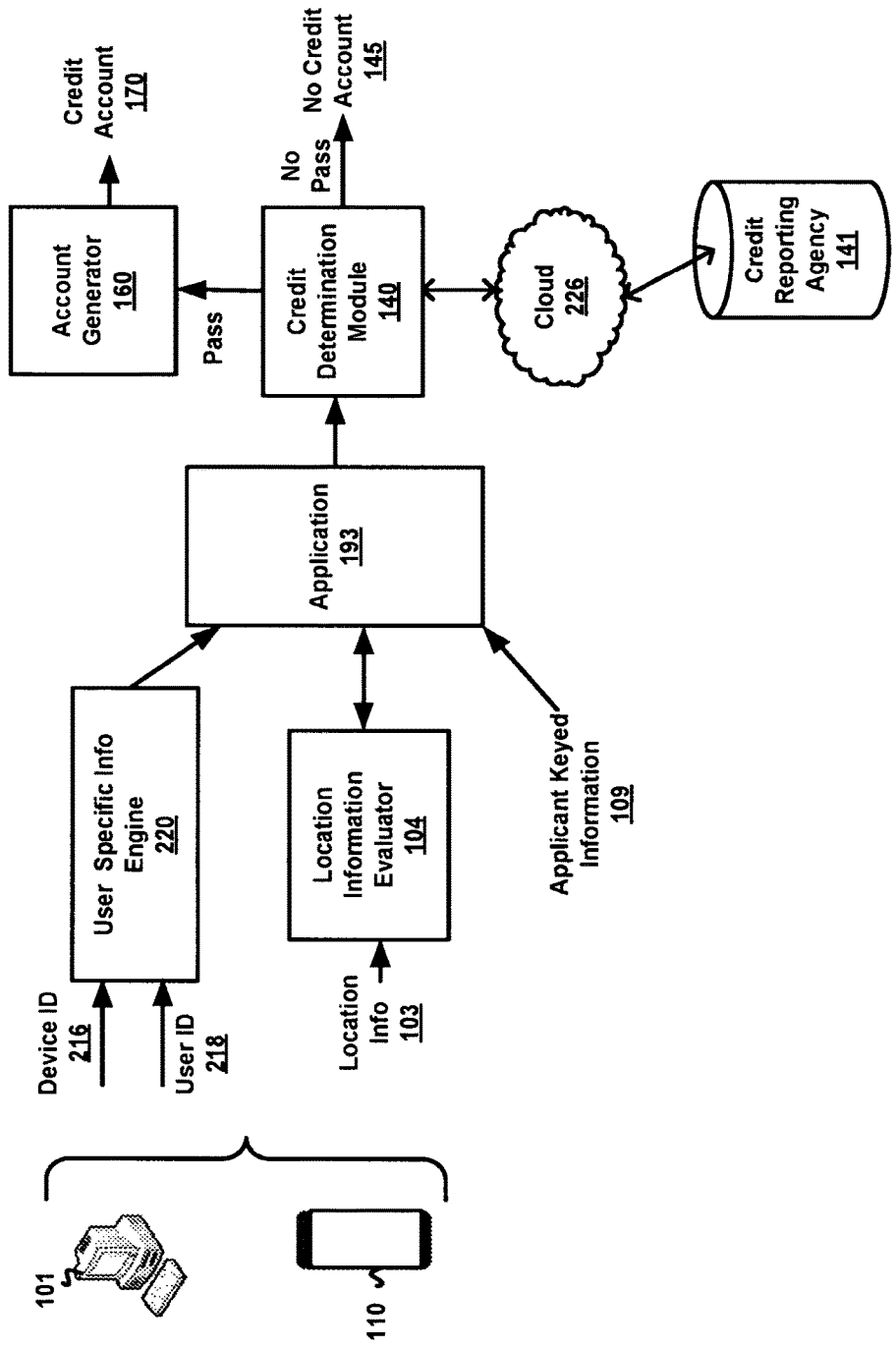
FIG. 1B is a block diagram of a system to pre-populate and verify information on a credit application, in accordance with an embodiment.

With reference now to FIG. 1B, a block diagram of a system 166 for obtaining and verifying information on a credit application 193 is shown in accordance with an embodiment. System 166 includes a non-phone computing device 101, a mobile phone 110 having a mobile application installed thereon, location information 103, applicant keyed information 109, location information evaluator 104, user specific information engine 220, and application 193.

Application 193 could be initiated by text links, URLs, NFC, beacon, WiFi, RFID, scannable 2D codes, etc. In general, 2D codes include aspects such as visual images, QR code, and the like.

In one embodiment, the location information could be the location of the mobile phone or non-phone computing device. In one embodiment, the location of the mobile phone can be determined via geo-fence, beacon range, a ping, NFC, WiFi, or the like. Moreover, the location may be an actual location or a relative location.

For example, actual location information may be obtained by the user's mobile phone location services, such as but not limited to, GPS, WiFi, cellular service, beacon derived location determination, and the like. Moreover, the location determination can be useful even at differing levels of accuracy. For example, a GPS enabled mobile phone would provide location information that is accurate to within a few meters and would be lat long coordinates (or similar).

In contrast, relative location information is location information determined via a broadcasting or receiving station (e.g., cellular service, beacon, WiFi access point, hotspot, or the like). The relative location would be the location of the station and a broadcast radius (or area) of coverage for the station. Moreover, if the device is picked up by two or more different stations, then the location could be further refined as being within the overlapping broadcast radii of the number of different stations. For example, although the actual location of the mobile phone may not be known, if the mobile phone is interacting with a beacon X, then the relative location of the mobile phone would have to be in range of beacon X broadcast radius. Similarly, a geo-fence could be used to determine that the location of the mobile phone is within the defined geo-fenced area, although the actual location of the mobile phone within the geofenced area may not be known.

In one embodiment, mobile phone 110 will use a positioning determining system such as global positioning system (GPS) or the like to determine location information 103. In another embodiment, the mobile phone may be able to determine a location within a given radius, such as the broadcast range of a beacon, WiFi hotspot, overlapped area covered by a plurality of mobile telephone signal providers, or some combination thereof.

Application 193 is a web based application accessed at a web site, from an application store, by scanning a visual code such as a barcode, a QR code on a physical item such as a poster, or the like. In another embodiment, the web-based location of application 193 is received by a beacon broadcast, WiFi broadcast, email, or the like. In one embodiment, application 193 obtains authorization from mobile phone 110 to access location information 103 on the mobile phone 110.

Location information 103 refers to the location of the mobile phone 110 at different times of the day as generated by a positioning system on the mobile phone 110, by location information on the user's home computer system or the like. Because of the different positioning systems available on a mobile phone and/or a non-phone computing device, the location information 103 can include differing levels of accuracy. For example, a GPS enabled mobile phone 110 can provide location information 103 that is accurate to within a few meters or less. In contrast, location information 103 derived from cellular service, beacon, WiFi location capabilities, and the like can provide a location radius or location area that may be within 10-50 meters or even larger.

Location information evaluator 104 uses location information 103 to determine an actual address. For example, in one embodiment, the location information 103 provided by mobile phone 110 are provided as coordinates data. In order to determine an address, location information evaluator 104 cross-references the coordinate data with one or more different coordinate-to-address determination sources such as: mapping software, surveyor data that includes business and/or residential information, County assessor's information, or other coordinate-to-address determiners. Further operation of location information evaluator 104 is shown and described in FIG. 5.

User specific information engine 220 receives a device ID 216 and/or a user ID 218 and utilizes the ID's to obtain user specific information to prepopulate application 193. The operation of user specific information engine 120 is discussed in more detail in the discussion of FIGS. 2A-2B.

Applicant keyed information 109 refers to information that is keyed/typed or otherwise input into application 193.

In one embodiment, the location information determined by location information evaluator 104, and the user specific information provided by the user specific information engine 220 is prefilled into the application 193. By pre-populating application 193 prior to presenting it to the applicant, the abandonment rate will be improved as the application 193 completion process is reduced. Moreover, the amount of required applicant keyed information 109 will be reduced.

In general, credit determination module 140 accesses a credit reporting agency 141 via cloud 226 to determine credit information for the user based on the application information. An example of cloud 226 is a network such as described herein. The credit reporting agency 141 may be a company such as, but not limited to, Experian, Equifax, TransUnion, Innovis and the like.

Credit determination module 140 will analyze the user's credit information provided by credit reporting agency 141 to determine if the user passes the criteria established to obtain a credit account. In one embodiment, credit determination module 140 will also determine a credit account limit. For example, the credit account limit may be 1,000.00 USD.

If the user does not pass the criteria established to obtain a credit account, no credit account 145 is established and no further action is taken.

If the user does pass the credit criteria established to obtain a credit account, the applicant's information is passed to account generator 160 and a credit account 270 is generated. In one embodiment, credit account generator 160 provides a digital credit account 270 identifier to the mobile phone. In one embodiment, the digital credit account identifier is instantly available to be used as a form of payment.

One example of a digital credit account identifier is a temporary shopping pass presented on the display of the mobile phone. In one embodiment, the temporary shopping pass includes aspects such as: the user's name, credit limit, store card account number, terms of use for the temporary shopping pass, a rotating GIF to prevent screenshots from being accepted at POS, a banner asking customer to present their ID to the associate to use the temporary account, and the like. These are shown in further detail in FIG. 4F.

Figure 2A:
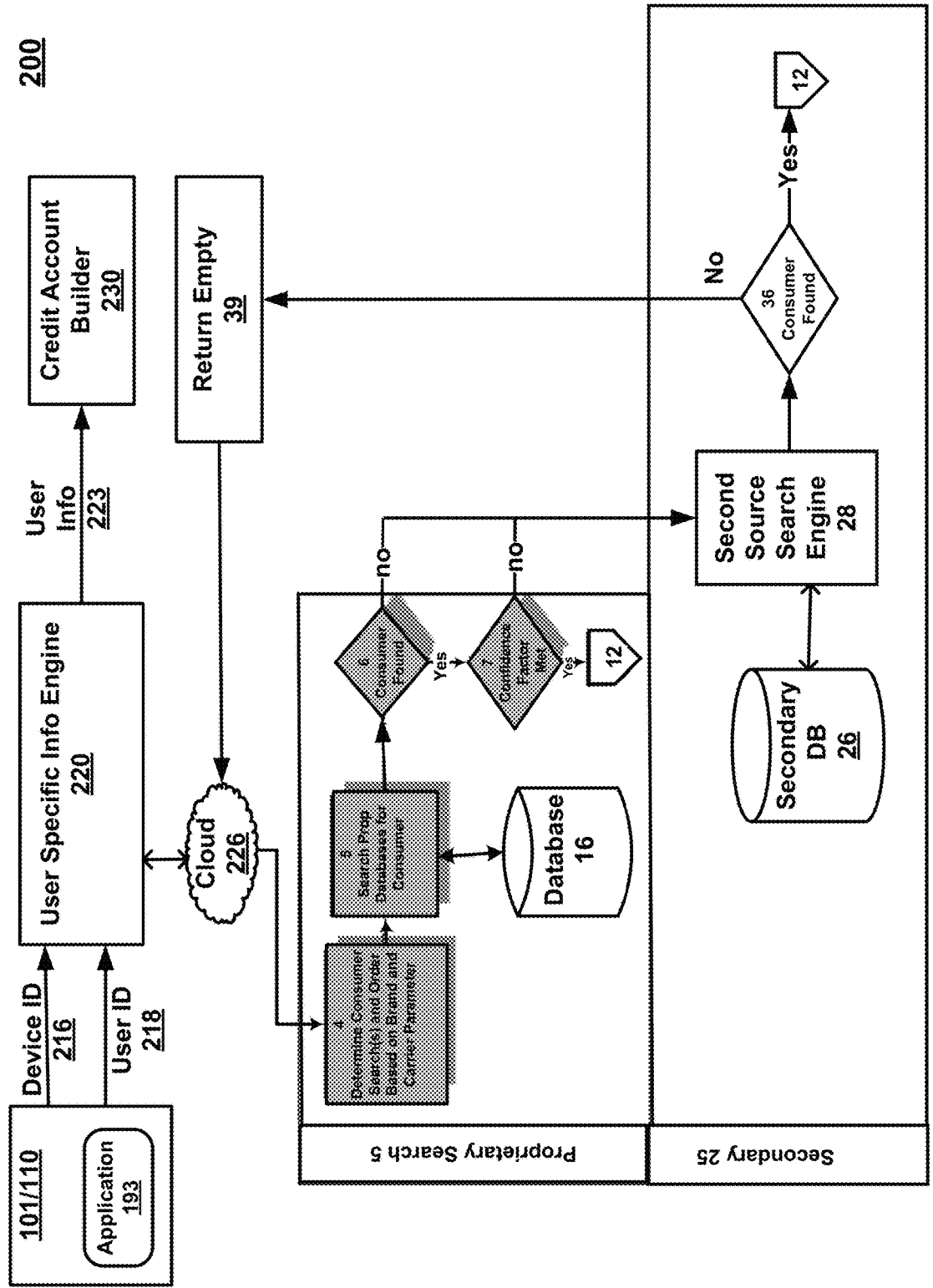
FIG. 2A is a block diagram of a user specific information engine accessing one or more different search locations, in accordance with an embodiment.

Referring now to FIG. 2A, a block diagram of a mobile credit acquisition system 200 is shown in accordance with an embodiment. In one embodiment, mobile credit acquisition system 200 includes a credit application 193, a user specific information engine 220, and a credit account builder 230. Although a number of applications and components are shown in mobile credit acquisition system 200, it should be appreciated that the components and applications may be located separately from one another. For example, one or more of the components and applications may be found on one or more locations, such as, but not limited to, a computer in the retail store, a server at a remote location, on the cloud 226 or the like.

In general, credit application 193 is an incentive offer for a user intended to be redeemed via a user's mobile phone. For example, credit application 193 may be a digitally redeemable incentive, an offer for a credit account, or the like. For example, the offer may be a discount percentage, a free gift, a coupon, a surprise gift, a surprise reward, or the like. Credit application 193 may be located on a physical item such as a poster, or the like and include a visual code such as a barcode, a QR code, a number to text, an email address to reply to, or the like. In another embodiment, credit application 193 is received by the user's mobile phone, e.g., via a beacon broadcast, WiFi broadcast, email, text, SMS, social media alert, app alert, or the like. In yet another embodiment, credit application 193 may be provided by an app on the user's mobile phone once the mobile phone is within a certain vicinity of the store providing the offer.

A number of different options may be available to respond to the credit application 193. For example, the response may be in the form of a message interaction, as shown and described in further detail in FIGS. 4A through 4C. In one embodiment, the response to the offer requires the user to provide a mobile phone ID 216 and a user ID 218.

In general, device ID 216 can be different depending upon the device. For example, a mobile phone device ID: includes identification characteristics such as, a mobile phone telephone number or mobile phone ID such as the mobile phone's serial number, international mobile equipment identity (IMEI), integrated circuit card identifier (ICCID) (e.g., the SIM card number), mobile equipment identifier (MEID), secure element chipset identify (SEID), or the like.

Non-phone computing device ID: includes identification characteristics such as a media access control (MAC) address, Internet protocol (IP) address, universal unique identifier (UUID), model number, product number, serial number, or the like.

In one embodiment, device ID 216 that is requested for the process is based upon an evaluation of which of the possible device ID's would provide the best capability for fraud prevention. For example, a user's mobile number could be easily obtained (e.g., via social media, public records, white pages, Internet search, etc.) so it would be a lower device ID option on a fraud scale. In contrast, the user's mobile phone serial number, international mobile equipment identity (IMEI), integrated circuit card identifier (ICCID) (e.g., the SIM card number), mobile equipment identifier (MEID), secure element chipset identify (SEID), or the like could is much less likely to be obtained fraudulently (via social media, public records, guessed, etc.) so it may be that one of the IMEI, ICCID, MEID, SEID, or the like would be the device ID with the highest fraud prevention value.

User ID 218 can be the user's identification information such as, name, zip code, social security number or portion thereof, driver's license number or portion thereof, or the like that is used to identify a specific user.

In one embodiment, the user ID 218 that is requested for the process is based upon an evaluation of which of the possible user ID's would provide the best capability for fraud prevention. For example, a user's birthday could be easily obtained (e.g., via social media, public records, etc.) so it would be a lower user ID option on a fraud scale. Similarly, a user's address could be easily obtained (e.g., via social media, public records, etc.) so it would also be a lower user ID option on a fraud scale. Further, a user's email could be easily obtained (e.g., via social media, public records, etc.) or easily guessed, so it would also be a lower user ID option on a fraud scale. In contrast, a social security number (or last four, six, seven, five, middle three, five, first 6, 7; middle three+last two; or any other amount or combination of the nine social security numbers) is much less likely to be obtained fraudulently (e.g., via social media, public records, guessed, etc.) so it may be that a pre-selected portion of the SSN (or a changing selected portion of the SSN) would be the user ID with the highest fraud prevention value.

Thus, a user's response to credit application 193 will include enough information for the mobile credit acquisition system 200 to perform a credit account qualification of the user for purposes of providing the user with a new credit account.

In one embodiment, user specific information engine 220 will receive a message from a user's mobile phone 110 in response to the credit application 193. The message will include device ID 216 and user ID 218.

In one embodiment, user specific information engine 220 will use device ID 216 and user ID 218 to obtain user specific information 223 to prepopulate an electronic form such as a credit application. In general, user specific information 223 could be at least two of: a name and full or partial address, a driver's license number, a social security number, or the like.

For example, user specific information engine 220 may access the different search locations via the cloud 226. An example of cloud 226 is a network such as the Internet, local area network (LAN), wide area network (WAN), or the like.

One embodiment uses the device ID 216 and user ID 218 information to perform a proprietary search 5 of at least one proprietary database 16. In general, the proprietary database 16 may be one or more databases such as a credit accounts database, or the like, that store a company's private database such as an Alliance Data Legacy database or the like. Proprietary database 16 will include user specific information 223 for customers that have existing accounts with the company, have previously applied for an account, or the like.

In one embodiment, the proprietary search 5 will only search a database related to a specific company. For example, if the credit account builder is a specific company, e.g., Nash's skate and bike emporium, then in a company specific database search, only the existing customer information related to Nash's skate and bike emporium will be searched. For example, a check is performed to see if the customer has an existing brand account, e.g., is already an existing customer in the database.

However, if the proprietary search 5 is for a group of companies, a shared information database, or the like, then all of the customer information in the databases may be searched for a match with the device ID 216 or the user ID 218. For example, if the database includes Nash's skate and bike, Mike's hardware, and Tarrin's dress stores, and all three companies are sharing information, then the search would encompass all three store's databases of information.

For example, search an internal accountholder database 16 to see if the customer has another account within the shared information database. For example, if the customer does not have a Nash's skate and bike account, the underlying credit account, e.g., Alliance Data database, is searched to see if the customer has an account at a different brand associated with Alliance Data.

In one embodiment, customer information 6 that is found in the proprietary database 16 will be verified using a confidence factor 7. For example, if only one record is found and it is 5 days old, the confidence in the found records would likely be below a confidence threshold. In contrast, if 2 years of records are found, such as prior accounts, present accounts, memberships, rewards information, and the like, then the confidence in the user specific information 223 found in the records would be above the confidence factor threshold. If the user specific information 223 is above the confidence threshold, then the user specific information 223 is deemed valid. At that point, the user specific information 223 is returned via return information 12 to user specific info engine 220 and then passed on to credit account builder 230.

One embodiment incorporates one or more of several fraud mitigation business rules to attempt to prevent fraudulent activity; e.g., to validate the found records. These business rules include logic that looks at specific activity on a customer's account that point to potentially fraudulent activities. In addition, a fraud mitigation tool may be implemented. The fraud mitigation tool will use device and internet protocol (IP) information to predict if the credit application can be trusted or will eventually become fraudulent.

For example, in one embodiment, the fraud mitigation tool will ignore any credit accounts that meet situations such as, but not limited to, the following: It is associated within a brand(s) that have been determined to have a high propensity for fraud. It is currently in a derogatory status. The account was opened within a defined number of days, where the number of days is controlled by internal parameters and can be tightened, loosened or turned off. The phone number matched has been changed within a defined number of days, where the number of days is controlled by internal parameters and can be tightened, loosened or turned off. An authorized buyer has been added to the account within a defined number of days, where the number of days is controlled by internal parameters and can be tightened, loosened or turned off. The address has been changed within a defined number of days, where the number of days is controlled by internal parameters and can be tightened, loosened or turned off. The account has been inactive within a defined number of months, where the number of months is controlled by internal parameters and can be tightened, loosened or turned off. Multiple accounts are found for the mobile phone number, zip code and last 4 digits of the SSN but all accounts are not the same person, and the like.

If no user specific information 223 is found during the proprietary search 5 or if the found user specific information 223 cannot be validated, then the device ID 216 and user ID 218 are passed on to a secondary search 25. At secondary search 25, a second source search engine 28 will search at least one secondary source database 26. One example of secondary source database 26 is a reverse phone number look up such as reverse phone look-up. However, other secondary source databases may be searched such as, but not limited to: social media sites, search engines, online public and/or private records, reverse name and phone number engines, and the like. In one embodiment, the user specific information 223 may be obtained by performing a secondary source database 26 search with the user ID 218 and the device ID 216.

In one embodiment, the secondary search 25 may be for example, a real-time call to a reverse phone look-up product to try and locate the customer. In general, reverse phone look-up products provide accurate and current customer telephone information. In many cases, the data is updated regularly from a broad range of sources, including regional bell operating companies, white pages and proprietary sources. One embodiment also integrates validation and authentication aspects that add further benefits to append address information for a customer. In general, validation and authentication aspects match customer name and zip code information that was returned from the reverse phone look-up, against data from a secondary source to return full address data.

If customer information 36 is found, then the user specific information 223 is returned via return information 12 to user specific info engine 220. If no user specific information 223 is found from the secondary search 25, then no user specific information 223 will be pre-populated into the forms. That is, the user specific info engine 220 will receive a return empty 39. However, if a match is made, then the user specific information 223 can be used to prepopulate a portion of the application, e.g., name, address, city, state, zip, mobile phone number, email, etc.

This is a benefit of the mobile credit acquisition with form population capability. Utilizing the form population reduces the amount of data a customer has to key by locating the customer's name and address via automated searches.

In one embodiment, when a customer has to enter or change their address and begins to type their address, a search is invoked that returns a list of potential results based on the zip code that was entered in the initial user experience. As more characters are typed, the picklist is refined to display closer matches. When the address is selected, it will be checked for completeness and the associated city and state will be auto pre-filled Referring now to FIG. 2B, a block diagram of a system 250 for adding a new credit account with purchase capability to mobile wallet 129 of a customer's mobile phone 110 is shown in accordance with an embodiment. In one embodiment, system 250 shows the user specific information engine 220 providing the user specific information 223 to credit account builder 230 is shown in accordance with one embodiment. In one embodiment, credit account builder 230 includes a credit screener 240, a new credit account generator 160, and a metadata file generator 265. Although a number of applications and components are shown, it should be appreciated that there may be more or fewer components and applications of credit account builder 230. Moreover, different pieces may be combined, re-organized, located separately from one another, or the like.

In general, credit screener 240 accesses a database 241, such as a credit reporting agency, via cloud 226 to determine credit information for the user based on the user specific information 223. An example of cloud 226 is a network such as described herein. The credit reporting agency could be a company such as, but not limited to, Experian, Equifax, TransUnion, Innovis and the like.

Credit screener 240 will analyze the user's credit information obtained from the credit reporting agency database 241 to determine if the user passes a credit criteria. If the user does not pass the credit screening process, no further action is taken by mobile credit acquisition system 250.

In one embodiment, after the user passes the credit screening then credit account builder 230 provides an application for a credit account to the user's mobile phone. In one embodiment, credit account builder 230 populates the application for a credit account with the user specific information 223 as shown in 437 of FIG. 4C. That is, credit account builder 230 will place the user specific information 223 provided by the user specific information engine 220 into the forms that are provided to the user's mobile phone. By populating the forms prior to presenting them to the user, the abandonment rate will be improved as the application process will be shortened due to the pre-filling of the customer's information into the application forms.

Figure 12:
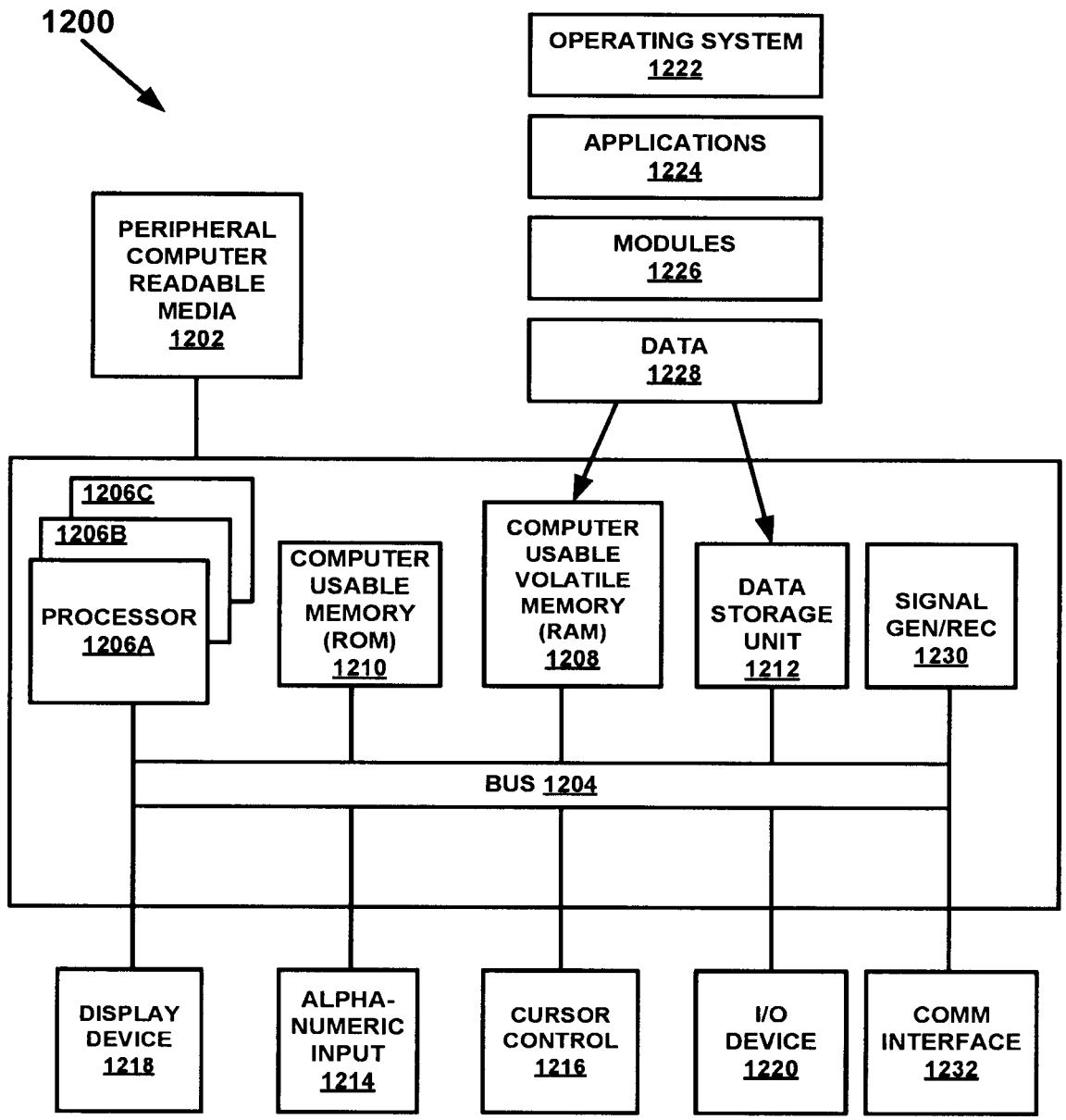
FIG. 12 is a block diagram of an example computer system with which or upon which various embodiments of the present invention may be implemented.

In one embodiment, credit account builder and/or new credit account generator 160 are computing systems similar to computer system 1200 described in detail in the FIG. 12 discussion herein. In one embodiment, new credit account generator 160 includes a customer account identifier 261, a customer data file builder 262, a token generator 263, and a metadata file generator 265.

In one embodiment, once the user completes the new credit account application, new credit account generator 160 will receive the information in the new credit account application from credit screener 240.

In one embodiment customer account identifier 261 accesses database 227 which stores a plurality of customer credit accounts and utilizes the user specific information 223 in order to identify any other accounts related to the customer. In one embodiment, customer account identifier 261 accesses database 227 via cloud 226. An example of cloud 226 is a network such as the Internet, local area network (LAN), wide area network (WAN), or the like. Database 227 may include store specific data, brand specific data, retailer specific data, a shared database, a conglomerate database, a portion of a larger storage database, and the like. Moreover, database 227 could be a local database, a virtual database, a cloud database, a plurality of databases, or a combination thereof.

In one embodiment, database 227 stores a plurality of customer credit accounts, a plurality of customer reward accounts and/or offers, coupons, and the like. Customer account identifier 261 searches database 227 for one or more customer accounts (e.g., credit accounts, reward accounts, and/or offers, coupons, and the like) that are held by the identified customer. If any other customer accounts are found, they are provided by the customer account identifier 261 to customer data file builder 262 which links the one or more customer accounts with the new credit account information to build a customer data file.

Token generator 263 then generates a token identifying the customer data file. In one embodiment the token is an identification number, hash, or other type of anti-tamper encrypted protection that is generated as an identifier for the customer data file.

Metadata file generator 265 generates a metadata file 270 formatted for mobile wallet 129, the metadata file 270 including the new credit account 170 and the token. In one embodiment, the new credit account 170 could include an image and the token is embedded within the image data. In another embodiment, the token could be separate from the image that is presented when new credit account 170 is accessed and would be provided at the time of the transaction. For example, the token could be provided via NFC between the mobile phone 110 and the POS when new credit account 170 is presented at the POS. In another embodiment, the entire new credit account 170 metadata file 270 could be provided via NFC at the time of the transaction and no imagery would be obtained by the POS even if it was presented on the display 112. In one embodiment, metadata file 270 includes an instruction that causes the new credit account 170 to be placed in a first location of mobile wallet 129 on the customer's mobile phone 110.

The metadata file 270 is then provided from the credit account builder 230 (e.g., a credit provider computer system, third-party computing system, or the like) to the customer's mobile phone 110. The metadata file 270 is added to mobile wallet 129 on the customer's mobile phone 110, wherein an access of the metadata file 270 in the mobile wallet causes the new credit account 170 to be presented by the customer's mobile phone 110. In general, the presentation of new credit account 170 by the customer's mobile phone 110 could be audible, visual, or the like, to provide payment at the time of a customer purchase as described herein.

In one embodiment, new credit account 170 is instantly available to be used as a form of payment. Additional details regarding the digital credit account identifier are shown and described with reference to FIGS. 4A through 4H herein.

Figure 3A:
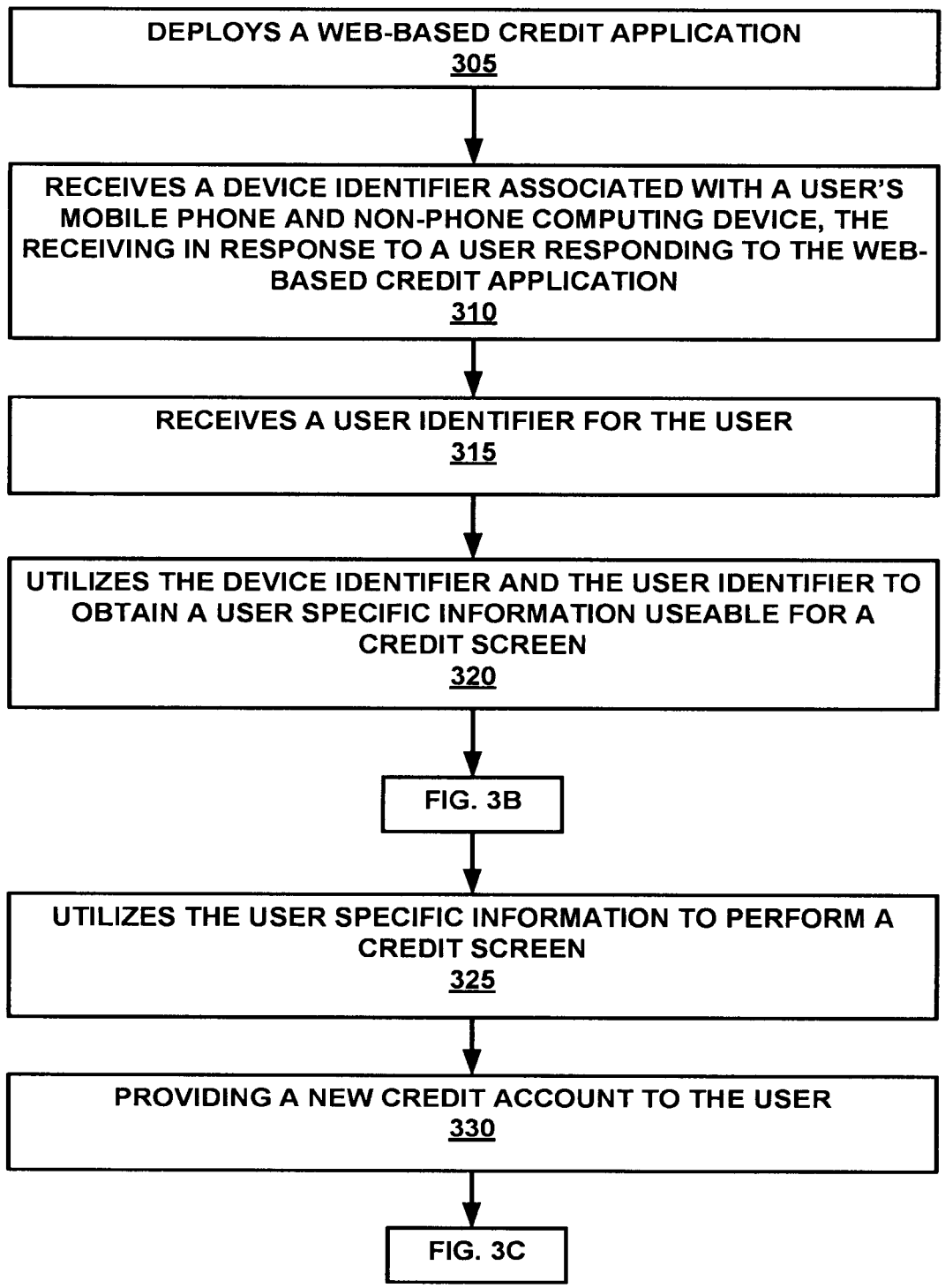
FIG. 3A is a flow chart of a method for mobile credit acquisition, in accordance with an embodiment.

With reference now to FIG. 3A, a flowchart 300 of a method for mobile credit acquisition is shown in accordance with an embodiment. FIGS. 4A through 4H are also utilized to provide clarity and support for the discussion of flowchart 300.

Flowchart 300 provides a credit application experience that works in a similar fashion regardless of whether the credit application experience is occurring on a mobile phone, on a non-phone computing device, or via a combination of both the mobile phone and the non-phone computing device. For example, the application experience could be handed off from the user's mobile phone to a non-phone computing device, or from the non-phone computing device to the user's mobile phone.

In one embodiment, the user accesses the credit application system via a mobile web. The application system can determine via device detection, if the customer began the application process from a mobile phone or if the customer began the application process on a non-phone computing device.

Figure 4D:
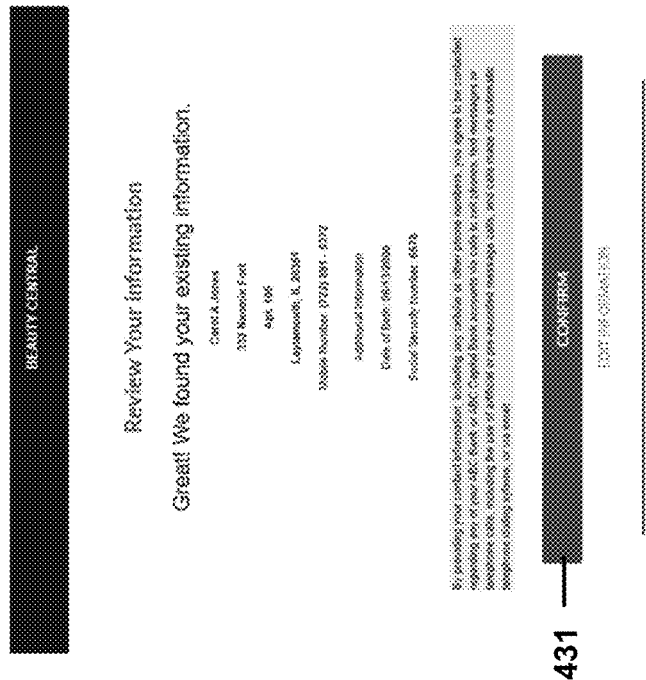
FIG. 4D is a screen capture of a web-based credit application requesting the verification of found user information as viewed on a user's computing device, in accordance with an embodiment.
Figure 4C:
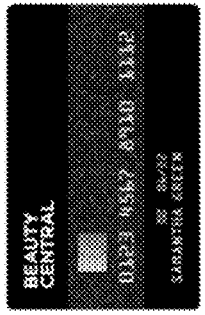
FIG. 4C is a screen capture of a web-based credit application requesting the verification code as viewed on a user's computing device, in accordance with an embodiment.

FIG. 4A is a screen capture 400 of a web-based credit application as viewed on a user's computing device shown in accordance with an embodiment. FIG. 4B is a screen capture 410 of a verification text to a user's mobile phone shown in accordance with an embodiment. FIG. 4C is a screen capture 420 of a web-based credit application requesting the verification code as viewed on a user's computing device shown in accordance with an embodiment. FIG. 4D is a screen capture 430 of a web-based credit application requesting the verification of found user information as viewed on a user's computing device shown in accordance with an embodiment. FIG. 4E is a screen capture 440 of a web-based credit application providing the terms and conditions as viewed on a user's computing device shown in accordance with an embodiment. FIG. 4F is a screen capture 450 of a new credit account as viewed on a user's computing device shown in accordance with an embodiment. FIG. 4G is a screen capture 460 of a confirmation that the new credit account information has been sent to the user's mobile phone as viewed on a user's computing device shown in accordance with an embodiment. FIG. 4H is a screen capture 470 of a text including instructions on putting the new account into the user's mobile wallet as seen on a user's mobile phone shown in accordance with an embodiment. Although a number of different pages are shown, it should be appreciated that the pages could be combined, reordered, skipped, more pages added, or the like. The use of FIGS. 4A-4H is one embodiment, that provides clarity for the discussion.

Although the interactions between a user's computing devices and the web-based application are shown in the format of text messages and screen captures, it should be appreciated that the interactions may be made via one or more of: a beacon broadcast, WiFi broadcast, email, text, SMS, social media alert, app alert, or the like.

With reference now to 305 of FIG. 3A, one embodiment deploys a web based credit application 193. In one embodiment, credit application 193 is an offer to open a new credit account with the retailer, or the like. In one embodiment, credit application 193 may be an offer to open a new reward account, or the like.

For example, information for accessing credit application 193 can be distributed on a physical item such as a poster, or the like that includes a visual code such as a barcode, a QR code, a number to text, an email address to reply to, or the like. In another embodiment, information for accessing credit application 193 is received by the user's mobile phone or non-phone computing device, e.g., via a beacon broadcast, WiFi broadcast, email, text, SMS, social media alert, app alert, or the like. In yet another embodiment, information for accessing credit application 193 is provided by an app on the user's mobile phone that will present credit application 193 once the mobile phone is within a certain vicinity of the store providing the offer.

For example, as shown in FIG. 4A, web page 400 includes a brand (beauty central) and an offer to open a new credit account. The web-based credit application includes a request for a mobile phone number 401, the last four digits of the SSN 402, a birthdate 403, and a zip code 404. Although a number of different requests are made, it should be appreciated that more or fewer questions may be initially requested by the application on web page 400.

With reference now to 310 of FIG. 3A, one embodiment receives a device identifier associated with a user's mobile phone 110 or non-phone computing device 101. As stated herein, device ID 216 can be different depending upon the device. For example, a mobile phone device ID: includes identification characteristics such as, a mobile phone telephone number or mobile phone ID such as the mobile phone's serial number, international mobile equipment identity (IMEI), integrated circuit card identifier (ICCID) (e.g., the SIM card number), mobile equipment identifier (MEID), secure element chipset identify (SEID), or the like. Non-phone computing device ID: includes identification characteristics such as a media access control (MAC) address, Internet protocol (IP) address, universal unique identifier (UUID), model number, product number, serial number, or the like.

In one embodiment, device ID 216 that is requested for the process is based upon an evaluation of which of the possible device ID's would provide the best capability for fraud prevention. For example, a user's mobile number could be easily obtained (e.g., via social media, public records, white pages, Internet search, etc.) so it would be a lower device ID option on a fraud scale. In contrast, the user's mobile phone serial number, international mobile equipment identity (IMEI), integrated circuit card identifier (ICCID) (e.g., the SIM card number), mobile equipment identifier (MEID), secure element chipset identify (SEID), or the like is much less likely to be obtained fraudulently (via social media, public records, guessed, etc.) so it may be that one of the IMEI, ICCID, MEID, SEID, or the like would be the device ID with the highest fraud prevention value.

For example, as shown in FIG. 4B, a one-time password 411 is sent to the user's mobile phone based on the phone number provided at 401 of FIG. 4A. In one embodiment, when the information put into FIG. 4A is sent, the non-phone computing device ID 216 will be sent as part of the metadata. In one embodiment, when the text is received, the user's mobile phone device ID 216 will be obtained via a request included in the text metadata.

With reference now to 315 of FIG. 3A, one embodiment receives a user identifier for the user. User ID 218 can be the user's identification information that was provided in FIG. 4A. In one embodiment, the user ID 218 that is requested on the page displayed in FIG. 4A is based upon an evaluation of which of the possible user ID's would provide the best capability for fraud prevention. For example, a user's birthday could be easily obtained (e.g., via social media, public records, etc.) so it would be a lower user ID option on a fraud scale. Similarly, a user's address could be easily obtained (e.g., via social media, public records, etc.) so it would also be a lower user ID option on a fraud scale. Further, a user's email could be easily obtained (e.g., via social media, public records, etc.) or easily guessed, so it would also be a lower user ID option on a fraud scale. In contrast, a social security number (or last four, six, seven, five, middle three, five, first 6, 7; middle three+last two; or any other amount or combination of the nine social security numbers) is much less likely to be obtained fraudulently (e.g., via social media, public records, guessed, etc.) so it may be that a pre-selected portion of the SSN (or a changing selected portion of the SSN) would be the user ID with the highest fraud prevention value.

For example, as shown in FIG. 4A, the user accesses a company web page that asks the user to provide a zip code, birthday, and the last four digits of a social security number as the user ID 218. Although the last four digits of a social security number is shown as the user ID 218, it should be understood that the user ID 218 may be something other than the last four digits of a social security number, such as user's zip code, entire or a different portion of a social security number, the driver's license number or a portion thereof, or the like; that is used to identify a specific user. In one embodiment, the company page 400 is a web page, a micro page or the like. After the user submits a response to page 400, the user ID 218 will be received.

Similarly, at FIG. 4C, the web-based credit application requests the verification code response 421 and once it is entered, in one embodiment, the user will click on the next 422.

Customer Information Acquisition

Figure 2B:
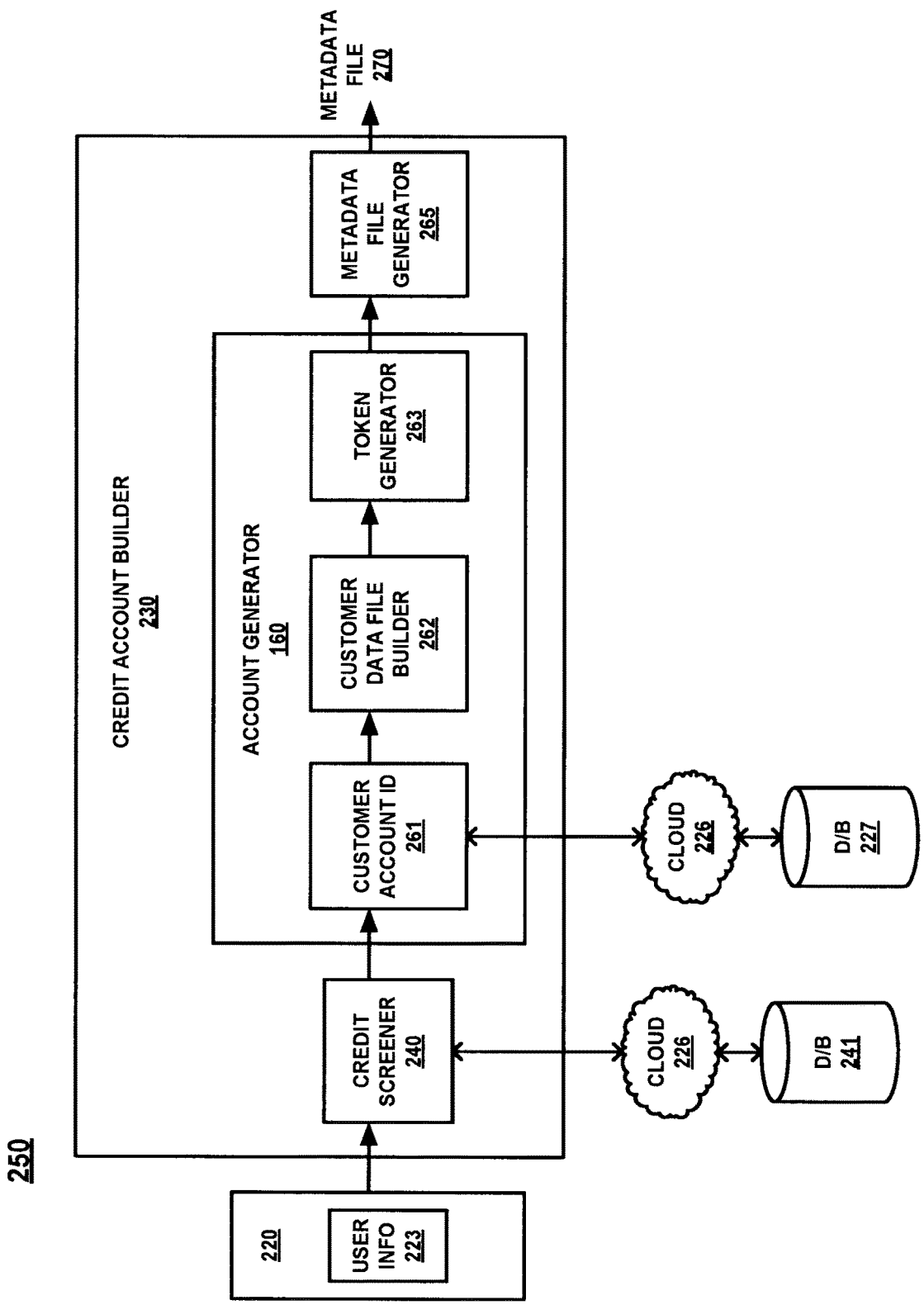
FIG. 2B is a block diagram of a system for adding a new credit account with purchase capability to a mobile wallet, in accordance with an embodiment.
Figure 3B:
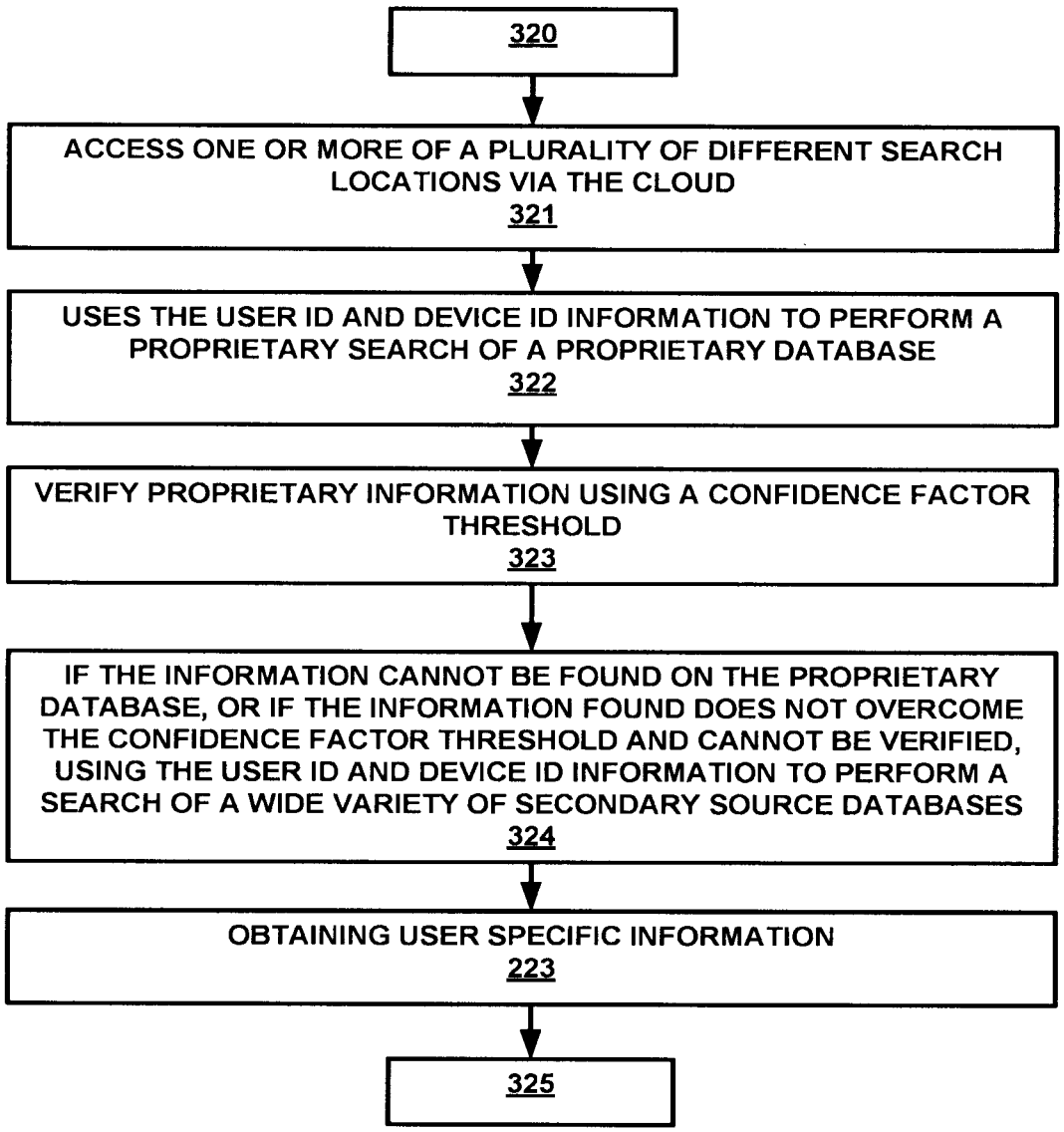
FIG. 3B is a flow chart of a method for utilizing the device identifier and the user identifier to obtain user specific information, in accordance with an embodiment.

With reference now to 320 of FIG. 3A and as shown and expanded in the flowchart 350 of FIG. 3B and shown in FIGS. 2A and 2B, one embodiment utilizes device ID 216 and user ID 218 to obtain user specific information 223 useable for a credit screen and/or to prepopulate an electronic form such as a credit application. In general, user specific information 223 could be one or more of: a name and full or partial address, a driver's license number, a social security number, or the like.

As shown at 321 of FIG. 3B, user specific information engine 220 may access one or more of a plurality of different search locations via the cloud 226. An example of cloud 226 is a network such as the Internet, local area network (LAN), wide area network (WAN), or the like.

As described at 322 of FIG. 3B, one embodiment uses the device ID 216 and user ID 218 information to perform a proprietary search 5 of a proprietary database 16. In general, the proprietary database 16 may be one or more databases that store a company's private database such as an Alliance Data Legacy database or the like. Proprietary database 16 will include user specific information 223 for customers that have existing accounts with the company, have previously applied for an account, or the like.

With reference now to 323 of FIG. 3B, in one embodiment, user specific information 223 that is found in the proprietary database 16 will be verified using a confidence factor threshold. For example, a confidence factor determination will be made by looking at the returned records to determine a confidence value. For example, if only one record is found and it is 5 days old, the confidence in the found records would likely be below the confidence value threshold. In contrast, if 2 years of records are found, such as prior accounts, present accounts, memberships, rewards information, and the like, then the confidence value in the user specific information 223 found in the records would be above the confidence factor threshold. If the user specific information 223 does pass the confidence threshold, then the user specific information 223 is returned via return information 12 to user specific info engine 220 and then passed on to credit account builder 230 as discussed and shown in FIG. 2B.

With reference now to 324 of FIG. 3B, if the user specific information 223 cannot be found on the proprietary database, or if the user specific information 223 found does not overcome the confidence factor threshold, one embodiment uses the user ID 218 and device ID 216 information to perform a search of a secondary source database 26. Examples of secondary source databases include Internet engines such as Google, Equifax, Experian, Yahoo, and the like. In one embodiment, the user specific information 223 may be obtained by performing an internet search with the user ID 218 and the device ID 216. For example, the search may include social media sites, search engines, online public records, and the like.

As shown at 223 of FIG. 3B, in one embodiment the user specific information 223 is provided via return information 12 to user specific info engine 220 and then passed on to credit account builder 230 as discussed herein and shown in FIG. 1A.

In one embodiment, if no user specific information 223 is found by secondary source engine 28, or if the user specific information 223 found does not reach the threshold of the confidence factor, the user specific info engine 220 will receive a return empty 39.

With reference now to 325 of FIG. 3A, one embodiment utilizes user specific information 223 to perform a credit screening. In one embodiment, the credit screening is performed based on information obtained from a credit reporting agency. However, in another embodiment, the credit screening will be based on other aspects, such as, but not limited to, the user's mobile carrier account history, the user's home ownership and the like. For example, if a user is identified as being a homeowner, the offer of credit can be made without the need for a credit screening performed by a credit reporting agency.

In one embodiment, as shown in FIG. 4D, the web-based credit application requesting the verification of found user information is presented with a screen 430 that includes the information being pre-filled with the information obtained by user specific info engine 220 and presented to the user. The user can confirm 431 that the information is correct, and that information will then be used to prepopulate the credit application as described herein. That is, the information such as name, address, city, state, phone number, email and the like, would be prefilled. Thus, instead of having to type in the information, the user would simply verify that the information is correct and make any changes accordingly. Similarly, if some of the information was missing, the user would be able to fill in only the missing portions without having to complete the entire form. Thus, the user would see a significant reduction in the number of keystrokes for the pre-filled forms which would increase throughput, decrease frustration and the time needed to fill out the forms.

FIG. 4E is a screen capture 440 of a web-based credit application providing the terms and conditions as viewed on a user's computing device. The user can choose to accept and continue 441 and/or receive an email 442 that includes the information. In one embodiment, the terms and conditions would include a signature portion. Once the user has signed and submitted the terms and conditions, the user would then be presented with the new account information as shown in FIG. 4F.

With reference now to 330 of FIG. 3A, once the user passes the credit screening, one embodiment provides the new credit account to the user. For example, as shown in FIG. 4F, the screen shot 450 of the new credit account is shown in accordance with an embodiment. In one embodiment, the new credit account includes a 2D code 454 that can be used by a retailer to scan and obtain the new credit account information. In addition, the screen shot 450 could include aspects such as, the user's name, credit limit, account number, reward information, and the like. In one embodiment, the screen shot 450 includes the option 451 of sending the digital card to the user's mobile phone and also the option of being done 452. If the user selects 451, then at FIG. 4G, a screen capture 460 of a confirmation 461 that the new credit account information has been sent to the user's mobile phone as viewed on a user's computing device.

At FIG. 4H is a screen capture 470 of a text 471 including instructions regarding how to load the new credit account 170 into the user's mobile wallet 129 as seen on a user's mobile phone. The operation of which is shown in FIG. 2B and the accompanying discussion.

Figure 3C:
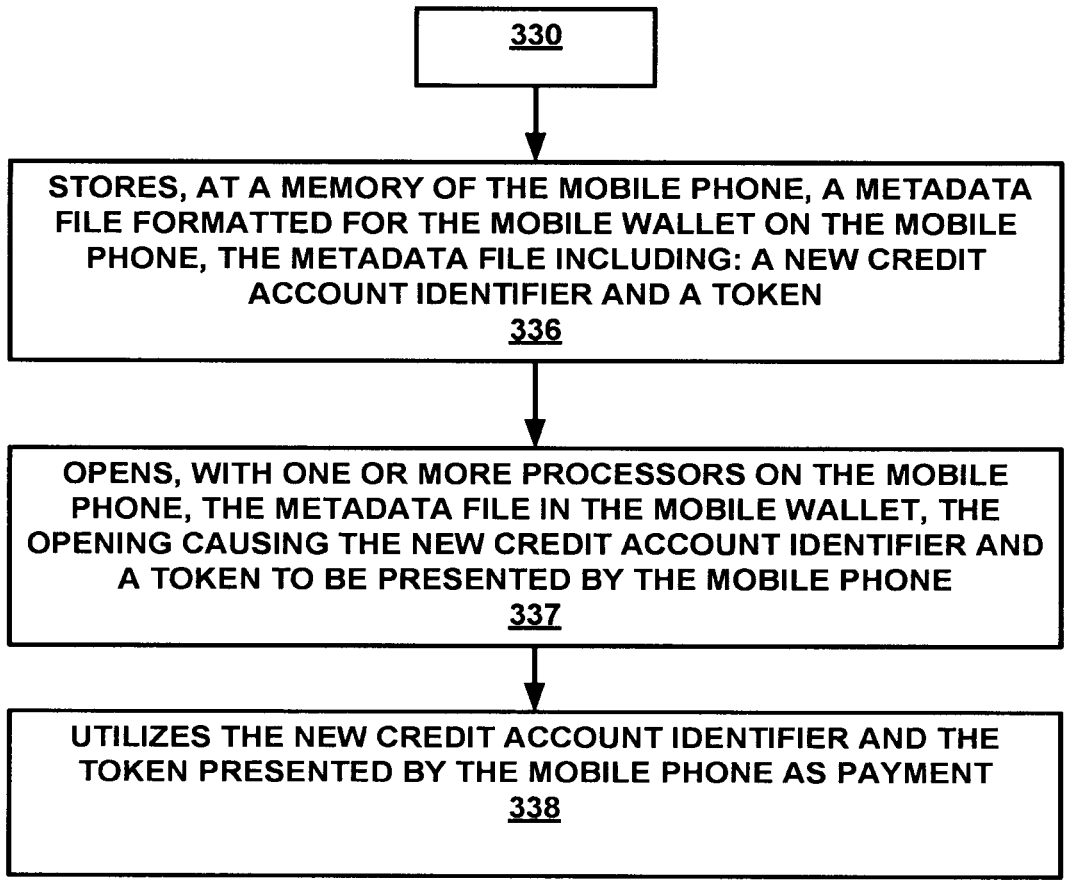
FIG. 3C is a flow diagram of a method for utilizing the new account in the mobile wallet of a mobile phone, to make a transaction, in accordance with an embodiment.

FIG. 3C is a flow diagram 375 of a method for utilizing a new credit account 170 in mobile wallet 129 of a mobile phone to make a transaction, in accordance with an embodiment.

Referring now to 336 of FIG. 3C, one embodiment stores, at a memory of the mobile phone, a metadata file formatted for the mobile wallet 129 on the mobile phone 110. The metadata file 270 includes the new credit account 170 and a token.

With reference now to 337 of FIG. 3C, one embodiment opens, with one or more processors on the mobile phone 110, the metadata file in mobile wallet 129, the opening causing new credit account 170 to be presented by the mobile phone 110. For example, after the metadata file 270 is added to the customer's mobile wallet 129, new credit account 170 would be accessible in the mobile wallet in the same way that any other items are accessed by mobile wallet 129. In one embodiment, the metadata file 270 could also include information that would make sure that the new credit account 170 opens on the top of the mobile wallet stack. For example, when the customer opened the mobile wallet application, new credit account 170 would be the first in the stack that could include other payment cards, tickets, etc.

With reference now to 338 of FIG. 3C, one embodiment utilizes the new credit account and (in one embodiment, the token) presented by the mobile phone as payment at a point-of-purchase, POS, associates mobile checkout device, etc.

For example, when the customer goes to a shop and during checkout intends to use a credit account linked to new credit account 170, the customer would present new credit account 170 to the POS (or another checkout system such as an associate's mobile phone, etc.) When new credit account 170 is presented at checkout it could include the transmission of the token via NFC, a scan of the new credit account 170 image, a scanning of a digital credit account identifier 454 provided with new credit account 170, etc. In general, since the new credit account 170 has already been validated the token would be provided in conjunction with the information. The token, metadata, barcode, and/or the like would be provided from the POS to the credit account provider which would validate the token and link the purchase to the appropriate customer credit account. The credit account provider would then provide the authorization for the purchase to the POS and the transaction would be completed.

In one embodiment, the transaction could also include information from the device such as user biometric information, location information (e.g., provided by a GPS), the transaction time, the transaction date, etc. In one embodiment, the location information provided by the mobile phone will include time and date stamp information. In another embodiment, the location, time and/or date could be obtained from the POS, a combination of the customer's mobile phone and the POS, etc.

In one embodiment, for the transaction to occur, new credit account 170 would be validated using the internet connection from the POS, the biometric information for the customer (as provided via a token or the like) from the customer's mobile phone, the location obtained from the mobile phone, the time, the date of the transaction initiation, the mobile phone identification number, etc.

In so doing, the security of the customer's new credit account 170 payment system would be seamless and nearly instantaneous to the customer and the associate handling the transaction, but would include a plurality of checks and balances performed by the credit account provider, the brand, or a fraud evaluator assigned to make fraud mitigation determinations and/or evaluations.

In one embodiment, once the new credit account 170 is received at the mobile wallet 129 on the user's mobile phone 110, it is instantly available to be used as a form of payment. In one embodiment, new credit account 170 will include a digital credit account identifier 454 that can be presented on display 112 of mobile phone 110. For example, digital credit account identifier 454 could be a QR code, bar code, digital image of a credit card, or other type of identifier for providing credit account information digitally to a POS.

One example of a digital credit account identifier 454 may include: the user's name, credit limit, store card account number, terms of use, a rotating GIF to prevent screenshots from being accepted at POS, a banner asking customer to present their ID to the associate to use the new credit account, or the like.

Fraud Detection

With reference now to FIG. 5, a block diagram of a system for fraud detection is described in accordance with an embodiment. In general, system 500 includes a fraud determination module 505 which receives address information from the location information evaluator 104 which determines the address from the raw location information 103 provided by mobile phone 110. System 500 also includes cloud 226 which may be any type or wired or wireless network connection including private, public, Local, Wide, Internet, and the like.

In one embodiment, fraud determination module 505 is a rules based fraud determination engine that can change the weighting of risk factors, etc. For example, the credit application accessed from a non-phone computing device provides a first authentication (e.g., a non-phone computing device ID) and a user ID. The inclusion of a phone number in the credit application process allows for a second factor authentication (e.g., a mobile phone ID). However, if the information provided to the web credit application (e.g., the name, address, phone number, email, etc.) does not match, the fraud determination module can provide that a first weight. In another example, if the non-phone computing device is at a first location, and the second factor authentication (e.g., the mobile phone) is in a different location (or a certain distance away from) the non-phone computing device, fraud determination module 505 can provide that a second weight that is different than the first weight.

In one embodiment, the user ID and/or the device ID information that is obtained can be used to evaluate for fraud. For example, the user ID that is provided to the application process is ranked or evaluated for its fraud potential. For example, 1 is the lowest fraud risk and 10 is the highest. If the user's zip code is provided it may be ranked at a 7 out of 10 for fraud. In contrast, if the last 6 of the user's SSN is provided it may be ranked at a 2 out of 10 for fraud.

Similarly, the device ID that is provided to the application process is ranked or evaluated for its fraud potential. For example, 1 is the lowest fraud risk and 10 is the highest. If the mobile number is provided, it may be ranked at a 5 out of 10 for fraud. In contrast, if the non-phone computing device UUID is provided, it may be ranked at a 2 out of 10 for fraud.

The fraud risk is then evaluated. The evaluation could be for one of the identifiers, both of the identifiers, or a combination of the identifiers. For example, in one embodiment when the fraud scale is base 10, the single identifier fraud risk would be evaluated as low if it is a 3 or below, medium if it is between 4-5, high if it is between 6-8, and unacceptable if it is 9 or above.

If both of the fraud rankings are added together the scale could remain the same or could be different. For example, the scale could remain the same, be doubled, have the range changed such that 15 (or whatever value is selected) is the new top range, etc. For example, the fraud risk for the combined value (using a top range of 15) would be evaluated as low if it is a 4 or below, medium if it is between 5-8, high if it is between 9-11, and unacceptable if it is 12 or above.

In another embodiment, the scale could be out of any number, e.g., 20, 50, 100, etc. depending upon the desired granularity. In one embodiment, there could be an additional level of granularity if the resultant fraud risk was at a certain level (e.g., a 6 could cause additional evaluation to determine a finer granularity of 6.3 or 6.6).

In one embodiment the result of the fraud risk determination controls at least one aspect of the new credit account. For example, if the fraud risk determination result is low, the fraud determination does not interfere with the amount of credit available on the new credit account.

In contrast, when the result of the fraud risk determination is medium, the amount of credit available on the new credit account may be reduced (for example the user would qualify for a credit limit A, the credit limit would be reduced by fraud risk amount (or percentage, or the like) B, resulting in an initial credit limit of A-B (or A reduced by B %, or the like). Similarly, when the result of the fraud risk determination is high, the amount of credit available on the new credit account is again reduced based on the fraud risk. In one embodiment, the reduction of the credit limit is only for a probationary time period, such as until the fraud risk is deemed to be lower.

In one embodiment, if the fraud risk determination is unacceptable, the application process will deny the customer from receiving the new credit account. In one embodiment, if the fraud risk determination is unacceptable the application process will deny the customer from continuing the application process for the new credit account. In one embodiment, if the fraud risk determination is unacceptable, the application process will not provide any automatic prefilling of the application and flag the application for the new credit account.

Consider the following example for purpose of clarity. In the following examples, the scale for a single risk factor is 10 and the combination of risk factors is 15.
  A. The user's zip code is provided and is ranked at a 9, e.g., an unacceptable fraud risk.
  B. The last 4 of the user's SSN is provided and is ranked at a 2, e.g., a low fraud risk.
  C. The mobile number is provided and is ranked at a 5, e.g., a medium fraud risk.
  D. The non-phone computing device UUID is provided and is ranked at a 2, e.g., a low fraud risk.

Example 1

If user ID 'A' (risk level 9) and device ID 'C' (risk level 5) were provided, the fraud determination would be an unacceptable user ID fraud risk, and a medium device ID fraud risk. If the fraud determination was based on the highest single fraud determination, then the fraud determination would result in an unacceptable fraud risk. In one embodiment, this would stop the application process and the user would be denied.

Example 2A

If user ID 'A' (risk level 9) and device ID 'C' (risk level 5) were provided, the fraud determination would be an unacceptable user ID fraud risk, and a medium device ID fraud risk. In one embodiment, the application could request a second user ID 'B' (risk level 2). After the user provided information user ID 'B', in one embodiment, the user ID fraud risk would become a risk level 2. If the fraud determination was based on the highest single fraud determination, then the fraud determination would result in medium fraud risk (risk level 5). In one embodiment, this would allow the application process to be completed but the user would receive a credit account that may or may not have a reduced credit limit (e.g., 1,000 dollar limit, etc.).

Example 2B

In one embodiment, the user ID and/or device ID is used during a look-up process for identifying the user and obtaining user information. The user information would be the information necessary for completing the application and/or the prequalification process. In one embodiment, user ID 'A' would be compared with the additional user information. If user ID 'A' (risk level 9) correlates with the user information, this could cause a further risk level reduction from the risk level 5 in example 2A to the low fraud risk level 4. In so doing, the user would not receive a reduced initial credit limit.

Example 3

If user ID 'A' (risk level 9) and device ID 'C' (risk level 5) were provided, the fraud determination would be an unacceptable user ID fraud risk, and a medium device ID fraud risk. If the fraud determination was based an amalgamation of two or more of the fraud components, then (in one non-weighted embodiment) the fraud determination would result in a risk level 14 which would result in an unacceptable fraud risk. In one embodiment, this would stop the application process and the user would be denied.

Example 4A

If user ID 'A' (risk level 9) and device ID 'C' (risk level 5) were provided, the fraud determination would be an unacceptable user ID fraud risk, and a medium device ID fraud risk. In one embodiment, the application could request a second device ID 'D' (risk level 2). After the user provided information D, in one embodiment, the device ID fraud risk would become a risk level 2. If the fraud determination was based on an amalgamation of two or more of the fraud components, then (in one non-weighted embodiment) the fraud determination would result in a risk level 11 which would be a high fraud risk. In one embodiment, this would allow the application process to be completed but the user would receive a credit account with a reduced credit limit (e.g., 500 dollar limit, etc.).

Example 4B

In one embodiment, the user ID and/or device ID is used during a look-up process for identifying the user and obtaining user information. The user information would be the information necessary for completing the application and/or the prequalification process. In one embodiment, device ID 'C' would be compared with the additional user information. If device ID 'C' (risk level 5) correlates with the obtained user information, this could cause a further risk level reduction from the high fraud risk level 11 in example 4A to the medium fraud risk level 8. In one embodiment, this would allow the application process to be completed but the user would receive a credit account that may or may not have a reduced credit limit (e.g., 1,000 dollar limit, etc.).

Example X

If user ID 'A' (risk level 9) and device ID 'C' (risk level 5) were provided, the fraud determination would be an unacceptable user ID fraud risk, and a medium device ID fraud risk. In one embodiment, the application could request a second user ID 'B' (risk level 2). After the user provided information user ID 'B', in one embodiment, the user ID fraud risk would become a risk level 2. In one embodiment, the application could request a second device ID 'D' (risk level 2). After the user provided information D, in one embodiment, the device ID fraud risk would become a risk level 2.

If the fraud determination was based on the highest single fraud determination, then the fraud determination would result in low fraud risk (risk level 2).

If the fraud determination was based on an amalgamation of two or more of the fraud components, then (in one non-weighted embodiment) the fraud determination would result in a risk level 4 which would also be a low fraud risk.

Further, the user ID and/or device ID is used during a look-up process for identifying the user and obtaining user information. In one embodiment, user ID 'A' and device ID 'C' would be compared with the obtained user information. If user ID 'A' and device ID 'C' correlate with the obtained user information, this would provide a further fraud risk level reduction. In contrast, if one or both of user ID 'A' and device ID 'C' did not correlate with the obtained user information, this could result in an increase in the fraud risk level. In one embodiment, the increase could be to a next higher level. In one embodiment, the user may be asked about the lack of correlation.

In one embodiment, if one or both of user ID 'A' and device ID 'C' did not correlate with the obtained user information, the non-correlated information could be manually or automatically evaluated to determine if the lack of correlation is due to a clerical, typographical, or accidental error. For example, if user ID 'A' did not correlate, it would be evaluated. If the user input user ID 'A' was zip code 12555 and the obtained user information is zip code 12255, it may be evaluated as a user input error and no fraud risk escalation would be made. In contrast, if the user input user ID 'A' was zip code 96896 and the obtained user information is zip code 12255, it would be evaluated as a deceitful input and the fraud risk escalation would be made or additional fraud risk evaluations would occur.

Thus, the fraud determination could be set as the highest fraud ranking of the highest fraud component, it could be set as an amalgamation of two or more of the fraud components, it could be adjusted based on the following additional fraud determination factors, it could be set as a weighted value for one of the user ID versus the Device ID, e.g., the user ID ranking carries 20% weight and the device ID carries an 80% weight, etc. Of course, the weighting could be ID dependent, set to different values, or the like.

In addition to the device ID and user ID fraud determination discussed above, there could be additional fraud determination factors that are described below and can be used to modify the fraud risk determination.

Additional Fraud Determination Factors

After the user is identified and the user information is obtained, the user information will be evaluated to determine if the user's information in the account center has had recent changes to home address, email, phone number, etc. If a recent change has occurred, then additional fraud evaluation will occur.

For example, a static IP address correlated with a particular MAC address would have a low fraud risk. In contrast, a MAC address that changes with respect to a static IP address would have a higher fraud risk. In one embodiment, if the static IP address includes a certain number of different MAC addresses (e.g., more than 2, 5, 10, 20, etc.) then the fraud risk would be weighted based on the number of different MAC addresses received from the static IP address.

Known Fraudulent Address

In one embodiment, the location where the applicant completed the application is determined by location information evaluator 104 from the location information 103 provided by the mobile phone 110. The location information evaluator 104 would evaluate the real-time location information 103 and cross-reference the real-time location information 103 with the one or more different coordinate-to-address determination sources 517, to generate a likely address. Similar to above, if the accuracy of the location information is high enough, a complete address for where the applicant completed the application will be obtained. If the accuracy of the location information is not high enough, then a general area for where the applicant completed the application will be obtained.

In one embodiment, fraud determination module 505 will access a database 525 of known fraudulent addresses and compare the location where the application was completed with the known fraudulent addresses found in the database. Fraud determination module 505 will determine, based on the location comparison, whether the location where the application was completed is found in the database 525 of known fraudulent addresses. If the location where the application 193 was completed is found in the database 525 of known fraudulent addresses the credit application will be denied and no credit account 545 will be established. In contrast, if the location where the application 193 was completed is not found in the database 525 of known fraudulent addresses, the credit application will pass the fraud determination and the application will be passed to account generator 160 which will evaluate the application 193 and may issue a credit account 270.

If the location where the application 193 was completed cannot be defined specifically enough to ensure that it is not a match for, or not found in, the addresses of database 525 of known fraudulent addresses, then the fraud determination module 505 will be able to make a number of choices. For example, if the general location where the application 193 was completed is in an area that includes a threshold number (e.g., 4 within the same block, etc.) of known fraudulent addresses, fraud determination module 505 will deny the credit application and no credit account 545 will be established. In contrast, if the general location where the application 193 was completed is in an area that includes no known fraudulent addresses, fraud determination module 505 may pass the credit application to account generator 160 with a small fraud determination resulting in a suggestion that the initial credit amount be lowered accordingly. However, if the general location where the application 193 was completed is in an area that includes less than a threshold number (e.g., 2 within the same block, etc.) of known fraudulent addresses, fraud determination module 505 may pass the credit application to account generator 160 with a medium fraud determination resulting in a suggestion that the initial credit amount be lowered significantly.

In one embodiment, lowering an applicant's credit limit accordingly may mean a reduction of 10-20% from what would have been the initial credit amount while lowered significantly would mean a reduction of 50-75% in the initial credit amount. However, it should be appreciated that these percentages are one example. The risk aversion of the credit account provider may cause an increase or decrease in the percentages and even turn the medium risk applications into rejections such that no credit account 545 is established.

Previously Used Addresses

In one embodiment, fraud determination module 505 will access a database 535 of previously used addresses and compare the location where the application was completed with the previously used addresses found in the database. Fraud determination module 505 will determine, based on the comparing, whether the location where the application was completed is found in the database 535 of previously used addresses.

If the location where the application 193 was completed is not found in the database 535 of previously used addresses the credit application will pass the fraud determination and the application will be passed to account generator 160 which will evaluate the application 193 and issue a credit account 270.

However, if the location where the application 193 was completed is found in the database 535 of previously used addresses, fraud determination module will determine a type of residence at the location where the application was completed. In one embodiment, the type of residence may be found in the database 535 of previously used addresses. In another embodiment, fraud determination module 505 will receive additional information about the location from the one or more different coordinate-to-address determination sources 517 via location information evaluator 104. The additional information will be used to determine the type of residency.

Fraud determination module 505 will then make a risk assessment based on a result of the determination regarding the type of residence.

For example, if the location where the application 193 was completed is found in the database 535 of previously used addresses and it is determined that the type of residence at that address is a single family home, then the fraud determination module 505 will be able to make a number of choices. If the number of applications received from the previously used address exceeds a threshold number (e.g., 3 within the same single family home) fraud determination module 505 will deny the credit application and no credit account 545 will be established.

In contrast, if the number of applications received from the previously used address is less than a threshold number (e.g., 2 within the same single family home) fraud determination module 505 may pass the credit application to account generator 160 with a low fraud determination resulting in a suggestion that the initial credit amount be lowered accordingly.

Similarly, if the location where the application 193 was completed is found in the database 535 of previously used addresses and it is determined that the type of residence at that address is a multi-family home (e.g., condo, townhome, apartment building, etc.), then the fraud determination module 505 will determine the number of dwellings within the multi-family home. If the number of applications received from the previously used address exceeds a threshold number (e.g., 80% of the dwellings within the multi-family home) fraud determination module 505 will pass the credit application to account generator 160 with an intermediate fraud determination resulting in a suggestion that the initial credit amount be lowered accordingly.

In contrast, if the number of applications received from the previously used address is less than a threshold number (e.g., 80% of the dwellings within the multi-family home) fraud determination module 505 will pass the credit application to account generator 160 with a low fraud determination resulting in a suggestion that the initial credit amount be lowered accordingly.

In one embodiment, if the location where the application 193 was completed cannot be defined specifically enough to ensure that it is not a match for, or not found in, the addresses of database 535 of previously used addresses, then the fraud determination module 505 would report that lack of fraud determination to account generator 160. In another embodiment, if the location where the application 193 was completed cannot be defined specifically enough to ensure that it is not a match for, or not found in, the addresses of database 535 of previously used addresses, then the fraud determination module 505 would deny the application and no credit account 545 would be established.

However, it should be appreciated that these solutions to the problem that occurs when the location where the application 193 was completed cannot be defined specifically enough may be defined differently based on the risk aversion of the credit account provider. For example, the credit account provider may provide specific guidance such as an increase or decrease in the percentages, turn the medium risk applications into rejections such that no credit account 545 is established, or turn the rejections into some level of risk such that a credit account 270 is opened.

Store Attribution

In one embodiment, as described previously, the location where the applicant completed the application is determined by location information evaluator 104 from the location information 103 provided by the mobile phone 110. The location information evaluator 104 would evaluate the real-time location information 103 and cross-reference the real-time location information 103 with the one or more different coordinate-to-address determination sources 517, to generate a likely address. Similar to above, if the accuracy of the location information is high enough, a complete address for where the applicant completed the application will be obtained. If the accuracy of the location information is not high enough, then a general area for where the applicant completed the application will be obtained.

In one embodiment, location information evaluator 104 will access a database 555 of retail location addresses and compare the location where the application was completed with the retail location addresses found in the database. Location information evaluator 104 will determine, based on the location comparison, whether the location where the application was completed is found in matches a retail location address. If the location where the application 193 was completed does match a retail location address, location information evaluator 104 will automatically provide store attribution to the retail store associated with the retail location address.

Location Information for Fraud

Figure 6:
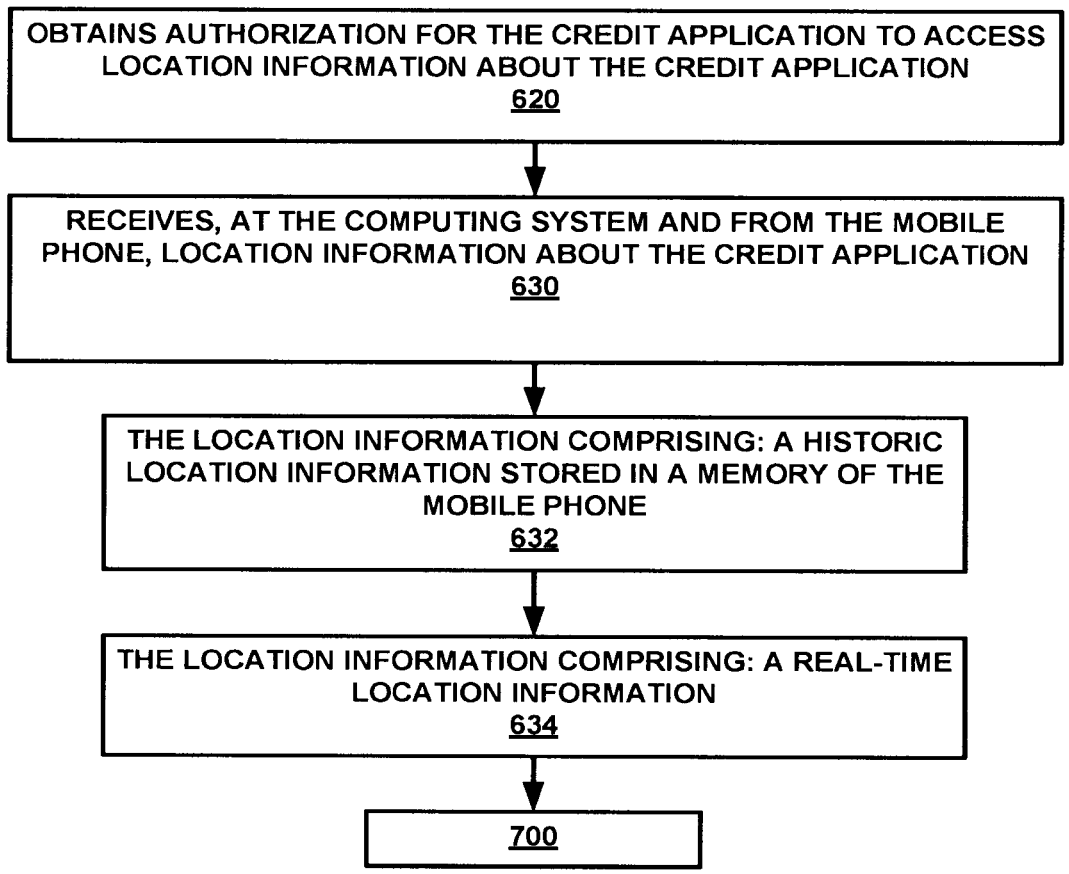
FIG. 6 is a flowchart of a method for using position location information to pre-populate information on a credit application, in accordance with an embodiment.

With reference now to FIG. 6, a flowchart 600 of a method for using position location information to fraud check a credit application is shown in accordance with an embodiment.

With reference now to 620 of FIG. 6, one embodiment obtains authorization for the application 193 to access location information 103 about the credit application.

With reference now to 630 of FIG. 6, one embodiment receives, at the computer system location information 103 about the credit application. In one embodiment, the location information 103 generated by a positioning system tracking such as GPS 218 on the mobile phone 110. In one embodiment, the positioning system is on the mobile phone, and is one or more of, but is not limited to, GPS, WiFi, cellular service, beacon derived location determination, NFC ranges, Bluetooth range, and the like. In another embodiment, the positioning system is virtual, which means that the positioning system is not on the mobile phone 110 but is an interface, such as a GPS chip interface, that functions with software or web applications allowing the location functionality to work outside of a traditionally defined mobile phone 110 or credit application.

Because of the different positioning systems available on a mobile phone, the location information 103 provided by one or more positioning systems on the mobile phone 110 can include differing levels of accuracy. For example, a GPS enabled mobile phone 110 can provide location information 103 that is accurate to within a few meters or less. In contrast, location information 103 derived from cellular service, beacon or WiFi location capabilities of mobile phone 110 can provide a location radius or location area that may be within 10-50 meters or even larger. For example, the mobile phone 110 being located within range of a beacon at ninth street, a Wi-Fi hot-spot at a given coffee shop, within range or a single cellular service tower, within an overlapping area of a number of cellular service towers, a combination of the above, and the like.

In one embodiment, included with the location information 103 would be a level of accuracy. For example, location information 103 may be identified as having a high level of accuracy (0-5 meters), a medium level of accuracy (6-20 meters), a low level of accuracy (>20 meters), or the like. Although a number of different accuracies are discussed, it should be appreciated that there may be more or fewer levels of accuracy associated with location information 103. Further, the ranges of the different levels of accuracy disclosed may also be different based on preference, guidelines, needs, and the like.

Additionally, location information 103 may be determined by the positioning system at constant intervals, at pre-assigned time periods, when location determination commands are received, based on the use of the mobile phone 110, an application on the mobile phone 110, when a change is noted by the positioning system, and the like. Further, location information 103 may be recorded in the memory of the mobile phone every time a location determination is made by the positioning system, at constant intervals, at pre-assigned time periods, when location storage commands are received, when a change is noted in the location information 103, and the like. Likewise, the level of accuracy may be determined each time location information 103 is generated by the positioning system, only when the level of accuracy has changed, at certain intervals of location information 103 generation, or the like.

At 632, location information 103 includes historic location information stored in a memory of the mobile phone. Historic location information refers to location information 103 that is not real-time location information. Historic location information will include a date/time stamp. The historic location information would allow the stored location information to be searched, sorted, and evaluated. In one embodiment, the historic location information includes all location information 103 stored on the memory of the mobile phone 110. Historic location information may cover the entire period the applicant has owned the mobile phone. In another embodiment, the time range for the historic location information is limited. For example, the location data may only be obtained for a pre-defined time range, e.g., the past 2 years, 1 year, 6 months, 3 months, 3 weeks, 5 days, etc. Although a number of time ranges are provided, it should be understood that the time range may be user definable, application pre-defined, established by the credit provider, established by law or statute, state or country dependent, or the like.

At 634, location information 103 includes real-time location information obtained from the positioning system. Real-time location information would be location information 103 that is generated in real time by the positioning system. The real-time location information would be constantly replaced as location information 103 generated by the positioning system received at the computer system, e.g., location information evaluator 104.

In one embodiment, location information 103 provided by mobile phone 110 is coordinate data. Therefore, to determine an address, the coordinate data is cross-referenced with one or more different coordinate-to-address determination sources such as: mapping software, surveyor data that includes business and/or residential information, County assessor's information, or other coordinate-to-address determiners.

Included with location information 103 would be the level of accuracy of the location information. As such, when the location information coordinate data is cross-referenced with the one or more different coordinate-to-address determination sources, the resulting address may be specific or may be a general ballpark area.

The high level of accuracy indication about the coordinate data would likely allow a specific address to be determined when location information 103 is cross-referenced with the one or more different coordinate-to-address determination sources.

The medium level of accuracy indication about the coordinate data may allow a specific address to be determined when location information 103 is cross-referenced with the one or more different coordinate-to-address determination sources, or may result in a general address area. The determination would be based on the actual level of accuracy, the density of businesses and residences within the radius of the location information, and the like. For example, in an area with houses on acre plots, the medium level of accuracy would indicate a specific house. However, in an area with clusters of businesses, such as a strip mall, the medium level of accuracy may only be able to narrow the business address to one of a few different possibilities.

Except for the most rural cases or the largest company buildings, the low level of accuracy indication about the coordinate data would not allow a specific address to be determined when location information 103 is cross-referenced with the one or more different coordinate-to-address determination sources. However, even at the low level of accuracy, the number of possible street names for a home or business address would be reduced.

In one embodiment, the applicant's likely home location is determined from location information 103 provided by mobile phone 110. The computer system, e.g., location information evaluator 104, would evaluate the historical location information received from the device for a plurality of prior overnight time periods over a plurality of different nights. For example, location information 103 can be organized into time periods, e.g., midnight to 5 am and then reviewed for a prior time period, e.g., weeks, months, etc.

The likely home location is then determined based on the historical location information evaluation. For example, by sorting and then tallying the locations of mobile phone 110 during the selected time period (e.g., the past 45 days), it is likely that the location that is found most often is where the applicant resides at night. Thus, it is likely the applicant's home location.

The applicant's likely home location, and the associated accuracy value of location information 103, is then cross-referenced with the one or more different coordinate-to-address determination sources to generate an address. If the accuracy of the likely home location is high enough, a complete address for the applicant's likely home is obtained. The complete address is then prefilled into the home address portion of application 193.

However, if the accuracy of the likely home location is not high enough to obtain a specific address, at least some level of information about the likely home location is obtained and provided to application 193. For example, a prefill capability for the application 193 can be simplified, or a drop down menu populated, by knowing what is local to the likely home location. As such, when the applicant is filling out the street address, the likely home location information is used to limit the number of possible streets that are offered in a drop down menu, a quick fill such as a type completion algorithm, or the like.

For example, if the applicant starts typing with the letter 'M', the limited number of possible streets within the likely home location area will cause application 193 to offer only those M street names. In this example, Maple, Moore, and Murray. After the applicant types 'M', the application will present the applicant with the prefill options of Maple, Moore, and Murray, from which the applicant can select. Alternatively, if the applicant continues by typing a 'u', the prefill will complete Murray as it is the only street within the likely home location containing those starting letters. Similarly, in the drop down menu context, every street name within the likely home location would be provided in the drop down menu and the applicant would select the correct street name from the drop down menu.

Likewise, the applicant's likely work address is determined from location information 103 provided by mobile phone 110. The computer system, e.g., location information evaluator 104, would evaluate the historical location information received from the device for a plurality of prior daytime periods over a plurality of different days. For example, the location information 103 can be organized into time periods, e.g., 9 am to 4 pm, and then reviewed for a prior time period, e.g., weeks, months, etc.

A likely work address is then determined based on the historical location information evaluation. For example, by sorting and then tallying the locations where mobile phone 110 was located during the selected time period (e.g., the past 30 days), it is likely that the location that is found most often is where the applicant works. Thus, it is likely the location of the applicant's work address.

Similar to above, the applicant's likely work location, and the associated accuracy value of location information 103, is then cross-referenced with the one or more different coordinate-to-address determination sources, to generate an address. If the accuracy of the likely work location is high enough, a complete work address for the applicant is likely obtained. The complete work address is then prefilled into the work address portion of application 193.

As recited above, if the accuracy of the likely work location is not high enough to obtain a specific address, at least some level of information about the likely work location is obtained and provided to application 193. For example, a prefill capability for the application 193 can be simplified, or a drop down menu populated, by knowing what is local to the likely work location. As such, when the applicant is filling out the street address, the likely work location information is used to limit the number of possible streets that are offered in a drop down menu, the quick fill type completion algorithm, or the like.

It should be appreciated that information for a number of different locations can be obtained in the same manner as described above. For example, the historical location information could be used, by the computer system, to determine an amount of time that the applicant has spent at a retail store location. The amount could be the total amount of time, the amount of time over the past month, week, or the like. If the amount of time surpasses an established threshold, the credit account 270 would receive a recommendation for an initial credit limit increase for the applicant.

Thus, the location information can be used to determine one or more of: a full or partial home address, a full or partial work address, a location where the application was completed, locations where the applicant spends a lot of time, locations where the applicant does not go, and the like.

Verification/Risk Assessment/Fraud Detection

With reference now to 710 of FIG. 7, one embodiment compares, at the computer system, e.g., location information evaluator 104, the location information from the positioning system with other location information provided on the credit application 193.

In one embodiment, the other location information provided within the credit application 193 is information provided by the applicant. Additionally, application 193 could include other location information obtained from a driver's license scan or search, from a search utilizing the mobile number provided by the mobile phone, from the user specific info engine 220 of FIG. 1B which uses some applicant identification and/or device identification information to perform a search for information. One or more of the sources may provide the resultant information into the application 193.

Verification

For example, location information 103 was used by location information evaluator 104 to determine that the applicant's home address is 123 Market Street. The other sources have also provided a home address of 123 Market Street to be prefilled into application 193. Since the comparing of the location information 103 obtained from mobile phone 110 with the information for the credit application obtained from another source matches, a verification of the probable home address is made.

Updating/Replacing

In the updating example, location information evaluator 104 determined that the applicant's home address is likely 123 Market Street. However, information obtained from one or more of the other sources have provided a different home address, e.g., 99 Onion Way to be prefilled into application 193. Since the comparison of the location information 103 obtained from mobile phone 110 with the information obtained from another source resulted in a difference between the two possible addresses, the information obtained from the one or more other sources is replaced with the location information 103 during the prefilling of application 193.

In one embodiment, in addition to replacing the location information obtained from the one or more other sources with the location information 103 from mobile phone 110 in the application 193, the location information 103 from mobile phone 110 can also be provided to the one or more of the other sources that had provided a different address. Such that the one or more other sources, e.g., 220 et al., will contain the updated location information.

Since there are a number of home addresses found, location information evaluator 104 compares the likely home address determined from the downloaded location information 103 with the home address provided on the credit application 193.

Risk Assessment

Referring now to 720 of FIG. 7, one embodiment makes, at the computer system, e.g., fraud determination module 505 of FIG. 5, a risk assessment based on a result of the comparison. The following discussion utilizes the home address for the comparison. However, it should be appreciated that any or all addresses determined to be of interest in the application, e.g., home, work, etc. can be subject to comparison. However, for purposes of clarity, the following example refers to the home address.

For example, when the comparison results in a similar or a matching home address as described in the verification portion, a risk solution from the risk assessment, would likely result in a low concern for fraud, e.g., it is likely that the address in the application 193 is correct.

In contrast, when the comparison results in a dissimilarity, as described in the updating/replacing section, a risk assessment would likely result in a concern of medium or high level fraud. For example, depending upon the source that provided the conflicting location information, the level of fraud risk would likely, but not necessarily, be different. For example, if the information was input by user specific info engine 220, the difference may be due to an incorrect match with the applicant, the applicant having moved, or the like. In that case, the level of fraud risk may be set to medium which would, in one embodiment, result in the applicant receiving a credit account 270 with a reduced initial credit limit.

However, if the incorrect information was input into application 193 by the applicant, the difference is likely due to error or deceit. Thus, a risk assessment would likely result in a concern a higher fraud risk. In one embodiment, due to the higher fraud risk, the applicant would receive a denial of the credit account, e.g., no credit account 545.

Alternatively, prior to denying the credit account, the applicant may receive an additional question about the inconsistency of the home address provided in application 193. If the applicant recognizes the mistake, and corrects the field to include a home address that matches the historical location information determination, then it is probable that the fraud risk level would be lowered to either medium, e.g., the applicant receiving a credit account 270 with an initial credit limit reduction, or a low concern, e.g., the applicant receiving a credit account with no initial credit limit reduction.

Customer Acquisition in the Digital Space without Initially Receiving Personally Identifiable Information (PII)

Figure 8:
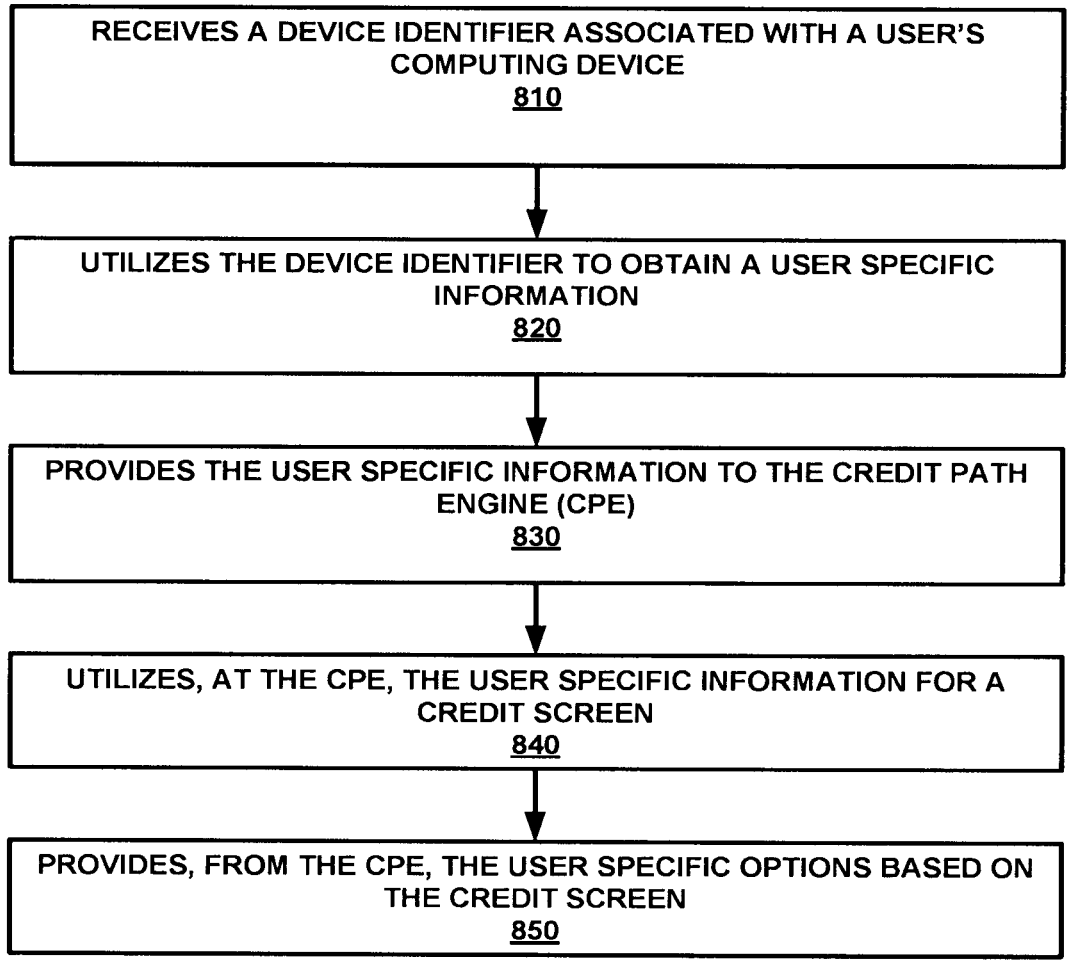
FIG. 8 is a flowchart of a method for customer acquisition without initially receiving personally identifiable information (PII), in accordance with an embodiment.

With reference now to FIG. 8, a flowchart 800 of a method for customer acquisition without initially receiving PII is shown in accordance with an embodiment. Although flowchart 800 illustrates one embodiment, it should be appreciated that in another embodiment, some of the inputs and/or outputs shown in block diagram 800 could be skipped, performed in a different order, or the like. Moreover, in one embodiment, some or all of the inputs and/or outputs that are shown in block diagram 800 could be substituted with similar processes or operations of processes that are shown in the Figures and described in the Specification.

In some cases, there are limitations on the ability to market, underwrite and acquire new accounts when PII is not shared or provided. To solve this problem, the following discussion will identify and authenticate a customer that is shopping on a brand's site (or in a brand's store) without the brand having to provide any PII data. The solution will further provide a method and system to dynamically control and optimize a credit path decision that would be prescribed to a user based on a number of attributes discussed herein. These attributes would be gleaned using one or more of the data sources discussed in flowchart 800 to build a customer attribute profile that is fed into the credit path engine (CPE). The CPE could then prescribe one or none of many credit path options.

By using flowchart 800, the acquisition to drive accounts is not provided by the brand. The PII is not shared by the brand or initially provided by the user. Further, the account can be acquired even if the brand is unable to perform a user prescreen (e.g., is technologically limited). Instead, the device identification information is obtained during the interaction and it is the device ID that is used to perform the identification, pre-screening, pre-qualification, qualification, offers, and the like.

By using the device ID 216 look-up, the brand is not sharing user PII, and the brand is also not missing out on the opportunity to acquire a new brand credit account holder due to any technological limitations.

Moreover, after the device ID 216 look-up, in one embodiment, the offer that is provided to the customer is an offer for a brand credit account or a co-branded credit account that is based on the prequalification made using the device ID 216. In one embodiment, the offer is not for a blanket credit account or some unrelated offer. Instead, the offer for the credit account or reward account (or the like) would include the brand specific credit account offer.

For example, if the user is at the store (or browsing online) Mike's fishing supplies, the device identifier would be used to perform a customer lookup. The lookup would confirm whether or not the user had a Mike's fishing supplies credit account. If the user has a Mike's fishing supplies credit account, then no further action is taken.

If the user does not have a Mike's fishing supplies credit account, then the look-up process described herein is used to identify the user and determine if the user qualifies for a Mike's fishing supplies credit account. If the user does qualify, then the user is offered a Mike's fishing supplies credit account, or a co-branded Mike's fishing supplies credit account. In one embodiment, the offer is similar to the beauty central credit account offer as described in FIGS. 4D-4H, or any combination thereof that could include some or all of the activities disclosed in FIGS. 4A-4H.

With reference now to FIG. 8, a flowchart 800 of the preapproval process is shown in accordance with an embodiment. Although flowchart 800 is one embodiment, it should be appreciated that in another embodiment, some of the processes shown in flowchart 800 could be skipped, performed in a different order, or the like. Moreover, in one embodiment, some or all of the processes that are shown in flowchart 800 could be substituted with similar processes or operations of processes that are shown in the Figures and described in the Specification.

Referring now to 810 of FIG. 8, one embodiment determines/obtains/receives the device ID 216. In one embodiment, a trigger to capture device ID 216 could be governed by: a shopping experience, a page progression and/or registration activity; a shopping cart activity and/or basket size; a logged in/guest status; and the like.

Referring now to 820 of FIG. 8, one embodiment utilizes the device ID 216 to obtain user specific information. For example, the device ID 216 is provided to user specific info engine 220 which then attempts to obtain information about the device (fraud linked to the device, anything from device ID that links to known issues, does more than one user utilize that device, is the IP address suspicious or has it been previously red flagged, are a lot of applications coming from the same device identifier, or from the same IP address (e.g., fraud determination) and the like). In one embodiment, the user information 223 is obtained as described in the discussion of FIG. 2A herein.

In addition, other user attributes can be included in, or added to, the user information 223. For example, the user information 223 can include a score or ranking obtained from a secondary source 25 as shown in FIG. 2A and discussed herein. Other user attributes could be, utility bills, mobile service provider information, other credit account bills, balances, or scores. The secondary source 25 could include a credit risk evaluation based on user credit history, access a source provider for a user risk review, access a source for the user's credit score, etc.

In one embodiment, credit account builder 230 is then used to begin building and further strengthening a user profile as described in discussion of FIG. 2B.

In one embodiment, credit account builder 230 components such as account generator 160 will search for other existing credit accounts held by the user. For example, the user may have a different brand (co-brand) credit account that is known by the account generator 160 and which can be used for user credit evaluation.

For example, credit account builder 230 will use the obtained user information 223 to identify any brand or co-brand credit account(s) the user may have, to identify any previously applied for brand or co-brand credit account(s) the user may have, determine if the user has previously been preapproved for the brand or co-brand credit account(s), determine if the user has previously been approved for (and possibly offered) the brand or co-brand credit account(s), and the like.

Referring now to 830 of FIG. 8, one embodiment provides the user information 233 to CPE 905. For example, any or all of the obtained user information 233 (e.g., name, address, user identification information, credit history, and/or any other gleaned information such as, but not limited to, one or more user purchase history information provided by the shopping site, spending habits, history, types of purchases, areas of interest, etc.) is provided to the CPE 905.

Referring now to 840 of FIG. 8, one embodiment utilizes at the CPE, the user information 233 for a credit screen. That is, the CPE 905 will evaluate the provided information to make a user specific credit decision.

Figure 9:
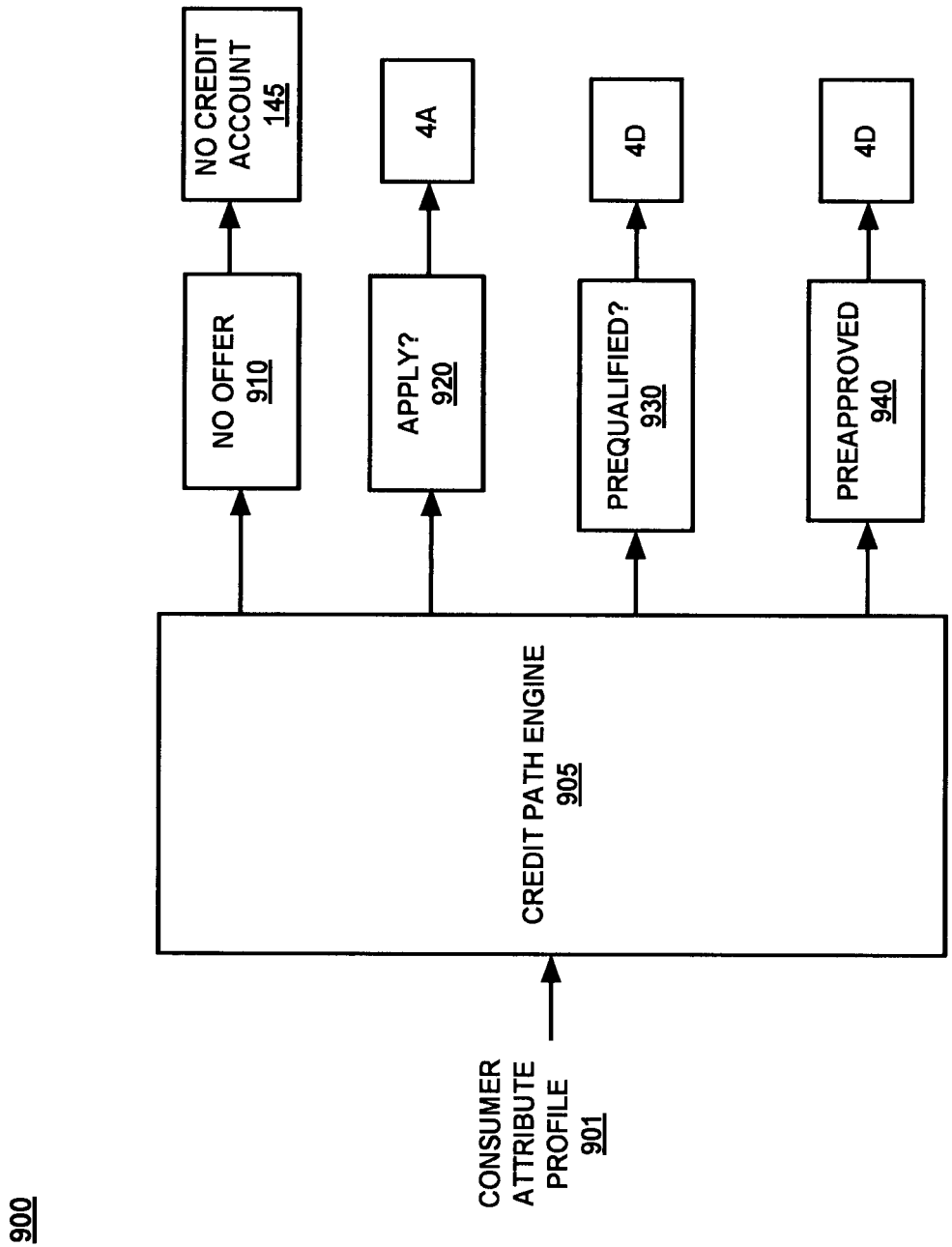
FIG. 9 is a block diagram of a credit path engine for customer acquisition without initially receiving PII, in accordance with an embodiment.

With reference now to FIG. 9, a block diagram 900 of a CPE 905 for customer acquisition without initially receiving PII is shown in accordance with an embodiment. Although block diagram 900 illustrates one embodiment, it should be appreciated that in another embodiment, some of the inputs and/or outputs shown in block diagram 900 could be skipped, performed in a different order, or the like. Moreover, in one embodiment, some or all of the inputs and/or outputs that are shown in block diagram 900 could be substituted with similar processes or operations of processes that are shown in the Figures and described in the Specification.

Referring again to 840 of FIG. 8 and also to FIG. 9, in one embodiment CPE 905 controls a credit prompt. In one embodiment, the control could include: brand preference/customer knowledge, the credit account program design, the user attribute profile developed by credit account builder 230, the channel, a champ/challenger feature, or the like.

Referring now to 850 of FIG. 8 and also to FIG. 9, one embodiment provides, from the CPE 905, the user specific options (or a prescribed credit path for the user) based on the credit screen.

In one embodiment, the CPE 905 would provide no offer 910 to the user, based on the results of the evaluation. As such, there would be no credit account 145 generated.

In one embodiment, the CPE 905 would provide an invitation to the user to apply 920. For example, CPE 905 would ask the user if they wanted to fill out an application to apply for a credit account (in one embodiment with auto prefill aspects) as discussed in FIGS. 3A-4F.

In one embodiment, the CPE 905 would provide a prequalified 930 invitation to the user. In one embodiment, the prequalification invitation could include a link (app, download, web based, etc.) for an application to apply for a pre-qualified credit account (in one embodiment with auto prefill aspects). In one embodiment, the prequalification could include an estimated pre-qualification credit account limit which would allow a user to know the likely (or actual) credit limit for which they are applying.

In one embodiment, the CPE 905 would provide a preapproved 940 offer to the user. The preapproved 940 offer would include a credit limit, a review of the user's information, and the terms. In one embodiment, the preapproved 940 offer can contain some or all of the steps of FIGS. 3A-4F, or could include only steps such as one or more of those shown in FIGS. 4D-4H. In other words, if the user wanted to obtain the preapproved credit account, the user would confirm the information to be correct (FIG. 4D), review and agree to the T's and C's (FIG. 4E), and then receive the approval notice of (FIG. 4F).

If the user also wanted to obtain the digital card, the user could request the card be added to the user's mobile wallet, or virtual card holder. One embodiment is shown in FIGS. 2B, 4G and 4H and their associated description.

In one embodiment, the operations could be integrated into a hybrid solution that could be partially run on the brand's own computer system and partially run by the credit providing system, such that the brand would be able to have the capability to integrate the solution into an app or software that would be available in almost real-time and without the brand needing to perform any upgrades or obtain any new hardware to have the capability. In one embodiment, the hybrid solution would provide the brand with a solution that is managed and/or maintained by the credit account provider which would reduce the technological and developmental requirements and/or education that would be needed by the brand to implement the credit account offering solution.

In one embodiment, the hybrid solution would allow the credit account provider to manage or set an offer criteria. For example, the credit account provider could limit the users that are provided to the service to only users having met minimum requirements, e.g., a user that has purchased at least 300 dollars' worth (or any value) of product in the past M-months, etc. Thus, every user that goes to the brand's website or visits the brand's store and uses their computing device would not be subjected to the offerings or expense in performing the credit offer opportunity.

Similarly, the hybrid solution would allow the brand to manage the user experience at a brand level. For example, the brand could limit the user's that are provided to the service to only users having met minimum requirements, e.g., a returning customer (or Xth time returning customer, a customer that has purchased at least 100 dollars' worth (or any value) of product in the past M-months, etc. Thus, every customer that goes to the brand's website or visits the brand store and uses their computing device would not be subjected to the offerings.

One-Time Loan

One embodiment uses a card swipe integration at the POS to screen for a one-time loan qualification. Instead of just offering a credit card opportunity to the customer, when the customer proffers a card at the POS to pay the transaction balance, the customer's credit is evaluated and further, in one embodiment, it is evaluated within the scope of the balance owed at the POS. When the customer qualifies, an offer for a one-time loan is made to the customer at the customer-facing portion of the POS. The customer can then use the one-time loan to pay the transaction balance instead of the originally proffered card.

Figure 10:
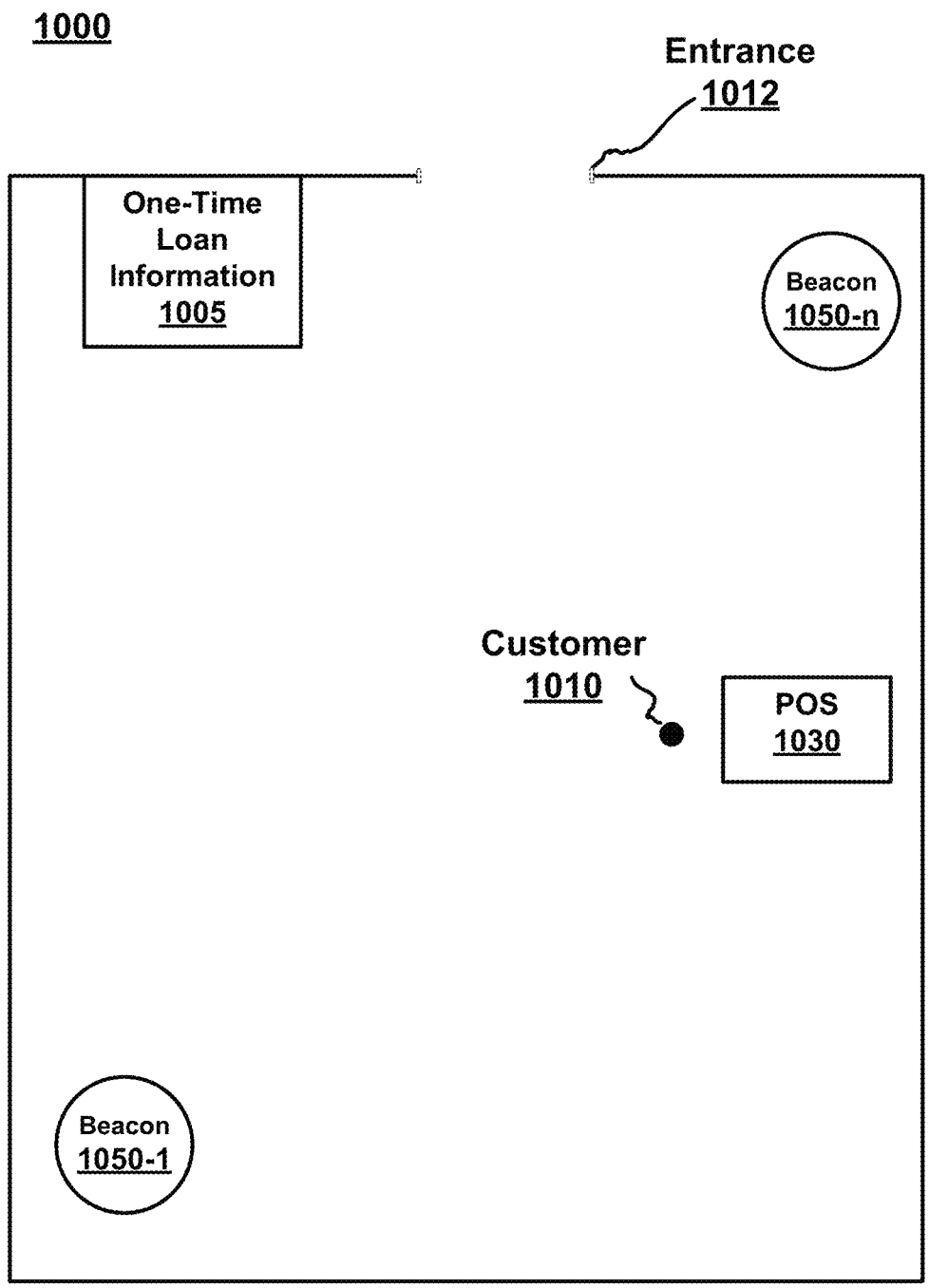
FIG. 10 is a top plan view of a retail establishment having a point of sale (POS), in accordance with an embodiment.

Referring now to FIG. 10 a top plan view of a retail establishment 1100 having a POS 1130, in accordance with an embodiment. In general, retail store 1000 is any physical brick and mortar store that provides goods for sale. In one embodiment, retail store 1000 includes an entrance 1012. In addition, in different embodiments and configurations, retail store 1000 can include one or more of, a poster or other presentation of one-time loan information 1005, customer 1010, and POS 1030.

In one embodiment, one-time loan information 1005 may be provided by the entrance 1012 to retail store 1000, in a section of the store such as a furniture, clothing, shoe section or the like. One-time loan information 1005 may be a presented on a physical item such as a poster, or the like and include a visual code such as a barcode, QR code, or the like. As such, offer 1005 may be scanned by the customer 1010 with the customer's mobile device.

In one embodiment, one-time loan information 1005 is provided via a beacon such as one or more of beacons 1050-1 through 1050-$n$. In another embodiment, one-time loan information 1005 is provided by an application on the customer's mobile device 110 after the customer's mobile device 110 is determined to be in store 1000, within range of beacons 1050. In yet another embodiment, the offer is provided on the customer's mobile device 110 when a location capability of the customer's mobile device 110 determines that the customer 1010 is located near retail store 1000. In general, near retail store 1000 refers to a location such as, within the bounds of the store, within a few yards of the store, within the mall in which store 1000 is located, within a beacon or WiFi broadcast range of store 1000, or within a block of retail store 1000.

For purposes of the present discussion, the mobile device location service, can be, but is not limited to, GPS, WiFi, cellular service, beacon derived location determination and the like. Moreover, the location determined by the mobile device location service may be useful even at differing levels of accuracy. For example, a GPS enabled mobile device 110 can provide location information that is accurate to within a few meters while a cellular service, beacon or WiFi location capabilities of mobile device 110 can provide a location radius or location area. For example, the mobile device 110 being located within range of a beacon, within the overlapping area of a number of cellular service towers, etc.

In general, the one or more of beacons 1050-1 through 1050-$n$ are devices that are configured to be communicatively coupled with customer's mobile device 110, such as via NFC, Bluetooth, WiFi, or the like. In one embodiment, one or more of beacons 1050-1 through 1050-$n$ is an iBeacon™, which is an indoor positioning system from Apple Inc. For example, the iBeacon is a low-powered, low-cost transmitter that can notify nearby iOS and/or Android devices of their presence. Although an iBeacon™ is provided as a specific example, the beacons are not limited to only that brand. Different beacons from other companies would also likely be acceptable.

In one embodiment, the one-time loan is offered to customer 1010 when the customer is checking out at POS 1030.

Figure 11:
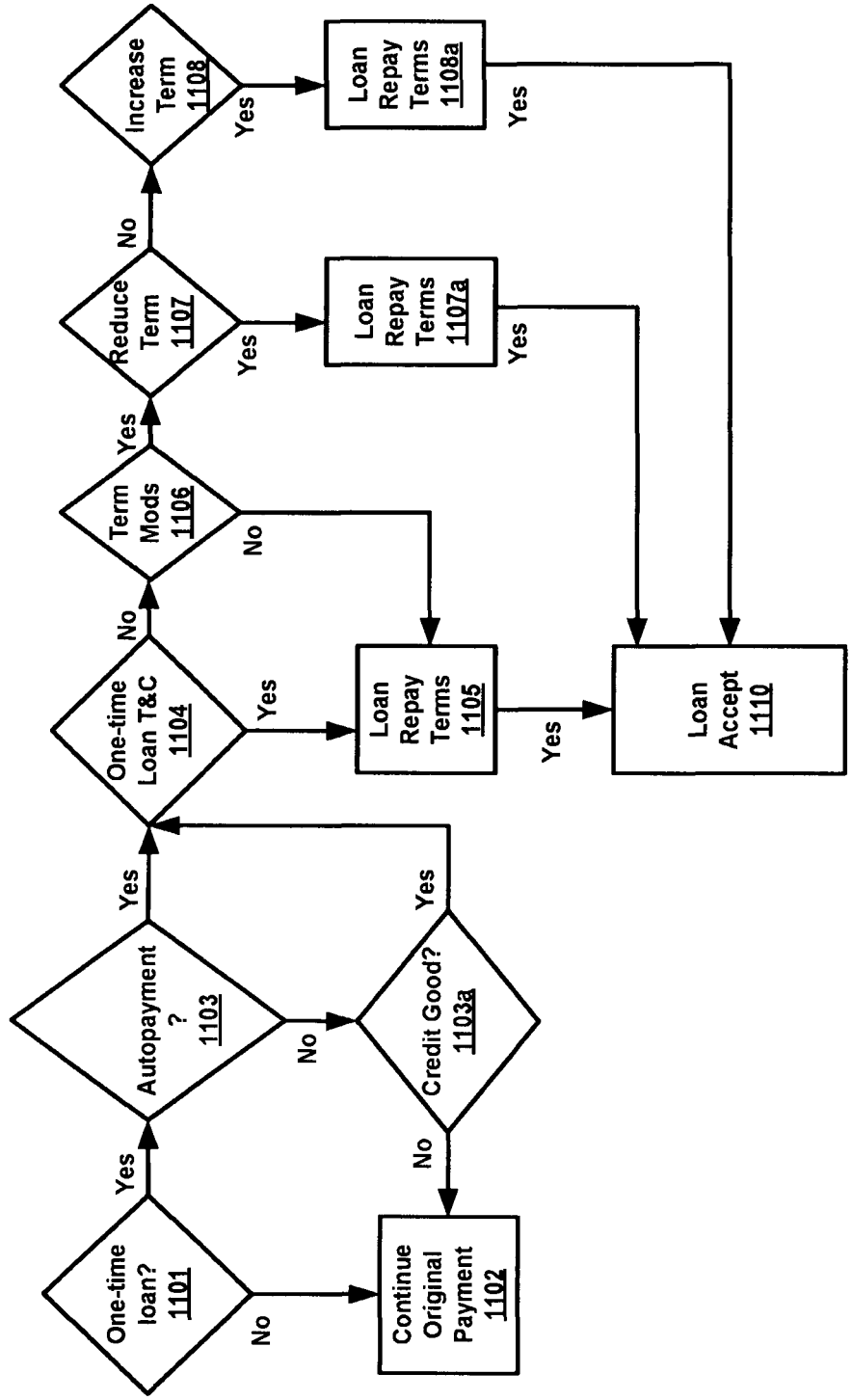
FIG. 11 is a flowchart of a method for providing an opportunity for a customer to replace a debit card payment with a one-time loan at a POS, in accordance with an embodiment.

Referring now to FIG. 11, a flowchart 1100 of a method for providing an opportunity for a customer to replace a debit card payment with a one-time loan at a point of sale POS is disclosed in accordance with an embodiment.

Identifying the Customer

In one embodiment, the customer is identified by information taken from level 1, level 2, and/or other levels that may exist such as level 3 (or other yet to be defined levels) that are included in the debit card (or credit card) transaction information obtained during the debit card's interaction with the POS (e.g., the swipe, chip, NFC [such as for virtual payments, from a payment from a bank app on a user's mobile device, from a mobile wallet payments, or the like]).

For example, each level of a bank card transaction is associated with a set of data fields, such that every debit card transaction will include customer identifying information.

Although the information within each level can change, depending upon account type, law changes, purchase requirements, fraud mitigation circumstances, and the like, the following discussion is one embodiment of some of the information found in the different levels.

The most basic and common type of bank card transaction is the level 1 transaction. In one embodiment, some of the basic data fields used to complete a level 1 bank card transaction include a merchant name, a customer's billing zip code, and a transaction amount. In one embodiment, additional information, such as the date and time of the transaction and additional cardholder information is automatically recorded by the bank but isn't explicitly reported by the merchant processing the transaction. However, in one embodiment, the additional cardholder information can be obtained at the time of the debit card use. This additional cardholder information could be name, address, and the like which could be used to perform the quick credit check. Thus, knowing the customer identification information and the transaction amount, the level 1 information in many cases would be enough information to perform a credit check and determine whether or not the customer qualifies for the already determined one-time loan amount (e.g., the transaction amount*plus any applicable fees or costs).

In general, the basic card payment processing terminal at a POS will have the technical capacity to request the level 1 data at the time of purchase and provide it to the one-time loan provider to perform the customer credit evaluation.

In one embodiment, level 2 transaction information includes the same three data fields as the level 1 transaction information, as well as other information such as a sales tax amount, customer reference number/code, merchant ZIP code, tax ID, and the like. In general, there is no need for the customer one-time loan qualifying system to use any of the level 2 transactional information. However, some of the level 2 transaction information could be used to identify the merchant for purposes of fraud determination.

That is, if the level 2 transactional information identified a fraudulent merchant tax ID, or other merchant identifier that made the transaction fall into a fraudulent category, that information could be used by the one-time loan provider for purposes of fraud detection and prevention. For example, a customer and fake merchant could try to fraudulently apply for the one-time loan. By detecting the fraudulent merchant information (or determining that the fraudulent merchant information is on a list of suspected or identified fraudsters), the one-time loan would not be offered to that "merchant" or their "customers". In one embodiment, any "customers" that are identified as being associated with the fraudulent merchant could also be flagged such that there would be no offer for a one-time loan for those "customers" even if they are at a verified merchant.

Level 3 transaction information is presently the highest data level and includes the maximum amount of information about the transaction. In addition to all of the data fields that make up level 1 and level 2 transactions, level 3 transactions require a number of data field such as, but not limited to, invoice number, order number, item product code, item commodity code, item description, and the like.

In one embodiment, there is no present need to obtain any of the level 3 data for the one-time loan qualification process. However, such transactional information could be valuable to the one-time loan provider for providing future offers, coupons, rewards and the like to the customer.

Once the customer identification information is obtained, the customer information is subjected to the search and qualification process as shown in FIGS. 1B-3C and discussed in at least the portion of the instant Specification associated therewith. The result of the search and qualification will be a decision as to whether or not the customer qualifies for the one-time loan.

Debit Card

If the customer attempts to perform the transaction with a debit card (e.g., a card tied to a customer's bank account), and the customer qualifies for a one-time loan in the amount defined by the purchase price, then the customer can be offered (from the customer facing device) a one-time loan. The offer can include loan amount, pay-off schedule, an APR, and the like. In one embodiment, the offer could include incentives such as no interest for the first x-months, breaking the total down into a number of monthly payments with only a single upfront fee (e.g., 5 dollars or 1% of the transaction whichever is greater), allowing the customer to select the number of monthly payments, and the like.

For example, the customer facing device could provide the customer with an opportunity to use a one-time loan instead of the customer's debit card to complete the transaction. In one embodiment, included in the offer is a number of payments option. For example, the customer is purchasing a television for $500.00. When the customer uses her debit card (e.g., swipes, chips, NFC, or the like) to provide the payment, identification information can be obtained from the debit card. This identification information can be used to run a credit screening on the customer. If the customer passes the credit screening, before the customer selects to complete the transaction, an offer 1101 to use a one-time loan is provided on the customer facing device. At that time, the customer will have the opportunity to either select the one-time loan as the means of payment, or turn down the offer to receive the loan 1102 and continue the checkout with the debit card.

In one embodiment, if the customer selects to use the one-time loan 1101, the customer will then receive at the customer facing device one or more options and/or pieces of information about the one-time loan.

In one embodiment, at autopayment confirmation 1103, the customer optionally decides to agree to an autopayment scenario before the customer can obtain the one-time loan. In one embodiment, the autopayment will be prefilled by the system using the account information obtained from the debit card swipe. For example, the offer would be to obtain the one-time loan and make the payments automatically from the bank account associated with the debit card. If the user does not want to set up the autopay then in one embodiment, the loan process is stopped and no loan 1102 is obtained.

In one embodiment, the autopayment confirmation 1103 is not a requirement. This could be based on a customer's credit score, risk factors, or the like. For example, if the customer has a credit score 1103a that is higher than a pre-defined threshold, the autopayment confirmation 1103 is not a requirement, such that if the user chooses not to join an autopayment process, the ability to continue the loan acceptance process is not interrupted.

In one embodiment, if the customer has a credit score that is higher than a pre-defined threshold, the autopayment confirmation 1103 could include an opportunity for a discount or reward if the user selects the autopayment process. For example, the customer could receive an extended no interest grace period for the loan, a reduction of the loan fee, a reduction in the loan interest rate, or the like.

After the autopayment question has been resolved, the customer will go to the loan amount and payment 1104. Here, the loan amount will be defined to include a default payment schedule and any terms and conditions. In one embodiment, the loan amount will be based on a customer modifiable condition. For example, the loan amount will be the transaction total plus any fees based on a default number of payments. In one embodiment, as shown in the default number of payments 1105, the one-time loan will need to be repaid over a 5 month period and will include a 10 dollar fee if that rate is accepted. Thus, the amount of the one-time loan would be 510 dollars (e.g., 500 dollars+10 dollar fee) broken down over 5 months thereby resulting in a monthly payment of 102 dollars per month for the next 5 months.

In one embodiment, the loan amount and payment 1104, will also include an optional opportunity for the customer to change the default one-time loan terms and conditions, the interest rate, any grace period information, the breakdown of payments, and the like.

If the customer accepts the default conditions and any additional terms and conditions that are included in the loan amount and payment 1104, then the customer will move to the one-time loan acceptance 11010 and the transaction will be completed with the one-time loan provider paying for the transaction instead of the customer's debit card.

If the customer chooses to review the opportunities offered by the optional changes to the default payment, the customer will move to the modify payments option 1106. At the modify payments option 1106, the customer will be able to review offers, additional fees, additional opportunities, and the like available by selecting a non-default monthly payment amount (or length of the loan term).

For example, the customer could receive a discount on the loan fees for a reduced loan term 1107. That is, the customer has the opportunity to pay off the loan within a time period that is shorter than the default time period. For example, if the customer pays off the loan in 2 months, there would be no interest charged and the loan fee would be reduced to 5 dollars. If that opportunity is accepted, the amount of the one-time loan would be 505 dollars (e.g., 500 dollars+5 dollar fee) broken down over 2 months thereby resulting in a monthly payment of 252.50 per month for the next 2 months.

If the customer accepts the reduced term 1107a conditions and any additional terms and conditions that are included therewith, then the customer will move to the one-time loan acceptance 11010 and the transaction will be completed with the provider of the one-time loan paying for the transaction instead of the customer's debit card.

In one embodiment, instead of obtaining the discount on the loan fees by reducing the loan term 1107, the customer could select to modify the payment options 1106 by extending the loan term and obtain a reduced monthly payment amount 1108. In one embodiment, extending the loan term will also result in a larger loan cost, than the loan cost included in the default number of payments 1105.

In one embodiment, reduced monthly payment amount 1108, will provide a limit as to the longest allowable term, have a predefined minimum monthly payment amount, or the like. In one embodiment, reduced monthly payment amount 1108 could provide a loan term range, a minimum monthly payment range, or the like. In one embodiment, when the customer looks at the different options, the appropriate loan fee will be incorporated into the payment plan option 1108a.

For example, if the customer would like to make monthly payments of 50 dollars toward the one-time loan, the customer would select the 50 dollar payment option and the modified loan terms would be presented to the customer at modified payment schedule 1108a. In one embodiment, when the customer chooses to pay 50 dollars a month toward the one-time loan, the loan fee would be increased by a defined amount and presented to the customer along with the terms and conditions. For example, the amount of the one-time loan would be 520 dollars (e.g., 500 dollars+10 dollar fee+10 dollars interest). Since the customer has selected to pay 50 dollars a month, the customer's loan term would be 11 months, with 10 months of 50 dollar payments and the 11th month being a 20 dollar payment.

If the customer accepts the modified payment schedule 1108a conditions and any additional terms and conditions that are included in the loan, then the customer will move to the one-time loan acceptance 11010 and the transaction will be completed with the provider of the one-time loan paying for the transaction instead of the customer's debit card.

Similarly, if the customer would like to make 10 monthly payments on the one-time loan, the customer would select the 10 months of payments option and the modified loan terms will be presented to the customer at modified payment schedule 1108a. In one embodiment, when the customer chooses to pay back the loan over a selected number of month that are longer than the default number of months, the loan fee would be increased by a defined amount and presented to the customer along with the terms and conditions. For example, the amount of the one-time loan would be 520 dollars (e.g., 500 dollars+10 dollar fee+10 dollars interest). Since the customer has selected a loan term of 10 months, the monthly payment would be 52 dollars per month.

If the customer accepts the modified payment schedule 1108a conditions and any additional terms and conditions that are included in the loan, then the customer will move to the one-time loan acceptance 11010 and the transaction will be completed with the provider of the one-time loan paying for the transaction instead of the customer's debit card.

In one embodiment, at one-time loan acceptance 11010, the customer will confirm the debit card account that is being used for the automated payments, and sign or otherwise identify themselves via the customer facing device. In one embodiment, the identification could be a signature, biometric information provided from the customer's mobile device, or the like.

By providing the one-time loan offer to the customer, the customer will get to know the one-time loan provider, and the one-time loan provider will get to know the customer. As such, either or both parties may reach out at a different time with a request for an actual credit account (from the customer), or an offer to open a credit account (from the one-time loan provider). For example, if the customer has a thin credit file, or would not qualify for a brand or co-branded credit account, the customer could still qualify for the one-time loan and be able to establish a thicker credit file, a relationship with the one-time loan provider that could flourish into a credit account with the one-time loan provider, and the like.

Similarly, the one-time loan provider would be exposing their operating style to the customer. As such, the customer would be able to "try out" the one-time loan provider for different aspects such as customer service, courtesy, and other customer relationship characteristics that are important to the customer. The exposure to the one-time loan provider could cause the customer to apply for (or accept an offer for) a credit account with the one-time loan provider based on the net experience.

In one embodiment, the one-time loan is advertised in the store so the customer can be made aware of the one-time loan opportunity prior to reaching the POS to provide a "basket lift". The store may have posters or other signage that will provide some amount of information about the one-time loan. Similarly, the store may have associates that will provide some amount of information about the one-time loan to the customer while the customer is shopping.

For example, in a suit section of a store, there may be a poster (or associate provided information) that lets the customer know that instead of purchasing one suit today, they could purchase three suits and pay them off over time using the one-time loan. Thus, in one embodiment, the customer could pick up a few additional items (or a more expensive item) with the goal of using the one-time loan option at the POS instead of paying with their debit card.

Although the use of a one-time loan is disclosed, embodiments herein can further be expanded to allow the customer to receive offers for multiple products (e.g., one-time loan, credit application, delay pay, and the like) with a single customer interaction (e.g., card swipe, card scan, card NFC, or the like) with a customer facing device at a POS.

Credit Card

In one embodiment, the card used for payment could be a credit card instead of a debit card. For example, if the customer attempts to pay at the POS with a credit card, the identification information can be obtained, and the customer could be screened for the one-time loan offer instead of using the swiped credit card. In one embodiment, the one-time loan offer could offer a better interest rate, a reward, an offer or the like in order to induce the customer to use the one-time loan instead of the credit card account to make the payment.

In one embodiment, the flow is similar to that of the debit account, except for 1103 where there would be no bank information obtained to establish the automatic bill payment. In one embodiment, at 1103, if the credit card is used, the customer will be asked to swipe their debit card at the customer facing device if they want to enter into the automatic bill payment. If the customer does not choose to swipe (or otherwise provide the account information) for automatic bill pay, the one-time loan provider could then either withdraw the one-time loan offer 1102, or if the customer qualified above a certain confidence threshold, continue to provide the one-time loan offer in a similar process as described above in the debit card discussion.

In one embodiment, by providing the one-time loan offer to the customer, the customer will get to know the one-time loan provider, and the one-time loan provider will get to know the customer. As such, either or both parties may reach out at a different time with a request for an actual credit account (from the customer), or an offer to open a credit account (from the one-time loan provider).

Example Computer System Environment

With reference now to FIG. 12, portions of the technology for providing a communication composed of computer-readable and computer-executable instructions that reside, for example, in non-transitory computer-readable medium for storing instructions of a computer system. That is, FIG. 12 illustrates one example of a type of computer that can be used to implement embodiments of the present technology. FIG. 12 represents a system or components that may be used in conjunction with aspects of the present technology. In one embodiment, some or all of the components described herein may be combined with some or all of the components of FIG. 12 to practice the present technology.

FIG. 12 illustrates an example computer system 1200 used in accordance with embodiments of the present technology. It is appreciated that system 1200 of FIG. 12 is only an example and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 12, computer system 1200 of FIG. 12 is well adapted to having peripheral computer readable media 1202 such as, for example, an external hard drive, a compact disc, a flash drive, a thumb drive, a wireless radio enabled device, and the like coupled thereto.

Computer system 1200 of FIG. 12 includes an address/data/control bus 1204 for communicating information, and a processor 1206A coupled to bus 1204 for processing information and instructions. As depicted in FIG. 12, system 1200 is also well suited to a multi-processor environment in which a plurality of processors 1206A, 1206B, and 1206C are present. Conversely, system 1200 is also well suited to having a single processor such as, for example, processor 1206A. Processors 1206A, 1206B, and 1206C may be any of various types of microprocessors. Computer system 1200 also includes data storage features such as a computer usable volatile memory 1208, e.g., random access memory (RAM), coupled to bus 1204 for storing information and instructions for processors 1206A, 1206B, and 1206C.

System 1200 also includes computer usable non-volatile memory 1100, e.g., read only memory (ROM), coupled to bus 1204 for storing static information and instructions for processors 1206A, 1206B, and 1206C. Also present in system 1200 is a data storage unit 1202 (e.g., a magnetic disk drive, optical disk drive, solid state drive (SSD), and the like) coupled to bus 1204 for storing information and instructions. Computer system 1200 also includes an optional alpha-numeric input device 1204 including alpha-numeric and function keys coupled to bus 1204 for communicating information and command selections to processor 1206A or processors 1206A, 1206B, and 1206C. Computer system 1200 also includes an optional cursor control device 1216 coupled to bus 1204 for communicating user input information and command selections to processor 1206A or processors 1206A, 1206B, and 1206C. Optional cursor control device may be a touch sensor, gesture recognition device, and the like. Computer system 1200 of the present embodiment also includes an optional display device 1208 coupled to bus 1204 for displaying information.

Referring still to FIG. 12, optional display device 1208 of FIG. 12 may be a liquid crystal device, cathode ray tube, OLED, plasma display device or other display device suitable for creating graphic images and alpha-numeric characters recognizable to a user. Optional cursor control device 1216 allows the computer user to dynamically signal the movement of a visible symbol (cursor) on a display screen of display device 1208. Many implementations of cursor control device 1216 are known in the art including a trackball, mouse, touch pad, joystick, non-contact input, gesture recognition, voice commands, bio recognition, and the like. In addition, special keys on alpha-numeric input device 1204 capable of signaling movement of a given direction or manner of displacement. Alternatively, it will be appreciated that a cursor can be directed and/or activated via input from alpha-numeric input device 1204 using special keys and key sequence commands.

Computer system 1200 also includes an I/O device 1220 for coupling system 1200 with external entities. For example, in one embodiment, I/O device 1220 is a modem for enabling wired or wireless communications between system 1200 and an external network such as, but not limited to, the Internet or intranet. A more detailed discussion of the present technology is found below.

Referring still to FIG. 12, various other components are depicted for system 1200. Specifically, when present, an operating system 1222, applications 1224, modules 1226, and data 1228 are shown as typically residing in one or some combination of computer usable volatile memory 1208, e.g. random access memory (RAM), and data storage unit 1202. However, it is appreciated that in some embodiments, operating system 1222 may be stored in other locations such as on a network or on a flash drive; and that further, operating system 1222 may be accessed from a remote location via, for example, a coupling to the internet. In one embodiment, the present technology, for example, is stored as an application 1224 or module 1226 in memory locations within RAM 1208 and memory areas within data storage unit 1202. The present technology may be applied to one or more elements of described computer system 1200.

System 1200 also includes one or more signal generating and receiving device(s) 1230 coupled with bus 1204 for enabling system 1200 to interface with other electronic devices and computer systems. Signal generating and receiving device(s) 1230 of the present embodiment may include wired serial adaptors, modems, and network adaptors, wireless modems, and wireless network adaptors, and other such communication technology. The signal generating and receiving device(s) 1230 may work in conjunction with one or more communication interface(s) 1232 for coupling information to and/or from system 1200. Communication interface 1232 may include a serial port, parallel port, Universal Serial Bus (USB), Ethernet port, Bluetooth, thunderbolt, near field communications port, WiFi, Cellular modem, or other input/output interface. Communication interface 1232 may physically, electrically, optically, or wirelessly (e.g., via radio frequency) couple computer system 1200 with another device, such as a mobile telephone, radio, or computer system.

The computing system 1200 is only one example of a suitable computing environment and is not intended to suggest any limitation as to the scope of use or functionality of the present technology. Neither should the computing environment be interpreted as having any dependency or requirement relating to any one or combination of components illustrated in the example computing system 1200.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A computer-implemented method for replacing a credit card payment with a one-time loan at a point of sale (POS), the method comprising:
  receiving, at a POS, a credit card swipe interaction, the credit card swipe interaction provided as a transaction payment, said credit card swipe interaction providing an electronic transfer of identification information from said credit card to said POS;
  providing, to a one-time loan provider computer system, a total monetary amount of the transaction payment and the identification information;
  utilizing, at the one-time loan provider computer system, the identification information to perform a credit screening for the total monetary amount of the transaction payment;
  receiving, at said POS and from the one-time loan provider computer system, a one-time loan offer, the one-time loan offer comprising a one-time loan to be used in place of the credit card swipe interaction for said transaction payment;
  providing, from said POS and to said one-time loan provider computer system, an acceptance of said one-time loan offer;
  receiving, at said POS and from said one-time loan provider computer system, said one-time loan;
  using, at said POS, said one-time loan to complete said transaction payment, said one-time loan used in place of said credit card swipe interaction provided as said transaction payment; and
  providing, from said POS and to said one-time loan provider computer system, a bank account information obtained from said credit card swipe interaction to establish an autopayment for a repayment of said one-time loan.

2. A non-transitory computer-readable medium for storing instructions, the instructions comprising:
  one or more instructions which, when executed by one or more processors, cause one or more processors to:
  obtain a total monetary amount of a transaction;
  receive a credit card chip interaction, the credit card chip interaction-provided as a transaction payment for said transaction, said credit card chip interaction to provide an electronic transfer of identification information from said credit card;
  utilize the identification information to perform a credit screening for a total monetary amount of the transaction;
  provide a one-time loan offer, the one-time loan offer comprising a one-time loan to be used in place of the credit card chip interaction for said-transaction;
  receive an acceptance of said one-time loan offer;
  utilize said one-time loan, in place of said credit card chip interaction, to complete said transaction; and
  utilize a bank account information obtained from said credit card chip interaction to establish an autopayment for a repayment of said one-time loan.

3. A system comprising:
  a point of sale computing device (POS) to receive a credit card near field communication (NFC) interaction, the credit card NFC interaction provided as a transaction payment, said credit card NFC interaction providing an electronic transfer of identification information from said credit card to said POS;
  provide, from the POS and to a one-time loan provider computer system, a total monetary amount of the transaction payment and the identification information;

utilize, at the one-time loan provider computer system, the identification information to perform a credit screening for the total monetary amount of the transaction payment;

receive, at said POS and from the one-time loan provider computer system, an offer for a one-time loan, the one-time loan offer comprising a one-time loan to be used in place of the credit card NFC interaction for said transaction payment;

present, at the POS, the offer for the one-time loan;

provide, from said POS and to said one-time loan provider computer system, an acceptance of said one-time loan offer;

receive, at said POS and from said one-time loan provider computer system, said one-time loan;

use, at said POS, said one-time loan, in place of said credit card NFC interaction, to complete said transaction payment; and provide, from said POS and to said one-time loan provider computer system, a bank account information obtained from said credit card NFC interaction to establish an autopayment for a repayment of said one-time loan.

* * * * *